US012395994B2

(12) United States Patent
Futaki

(10) Patent No.: US 12,395,994 B2
(45) Date of Patent: *Aug. 19, 2025

(54) RADIO TERMINAL, RADIO STATION, AND METHOD PERFORMED THEREBY

(71) Applicant: NEC Corporation, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,889

(22) Filed: Oct. 19, 2020

(65) Prior Publication Data

US 2021/0037564 A1 Feb. 4, 2021

Related U.S. Application Data

(63) Continuation of application No. 15/534,712, filed as application No. PCT/JP2015/003524 on Jul. 13, 2015, now Pat. No. 10,849,153.

(30) Foreign Application Priority Data

Dec. 25, 2014 (JP) ................................ 2014-262541

(51) Int. Cl.
*H04W 72/00* (2023.01)
*H04W 16/14* (2009.01)
(Continued)

(52) U.S. Cl.
CPC ........... *H04W 72/23* (2023.01); *H04W 16/14* (2013.01); *H04W 72/0446* (2013.01);
(Continued)

(58) Field of Classification Search
CPC .............................. H04W 72/14; H04W 72/04
See application file for complete search history.

(56) References Cited

U.S. PATENT DOCUMENTS 7,443,821 B2 10/2008 Cave et al.
2002/0150095 A1 10/2002 Sherman
(Continued)

FOREIGN PATENT DOCUMENTS

CN 101507121 A 8/2009
CN 102648646 A 8/2012
(Continued)

OTHER PUBLICATIONS

Chinese Office Action for CN Application No. 201580070734.X issued on Mar. 3, 2021 with English Translation.
(Continued)

*Primary Examiner* — Brandon M Renner

(57) ABSTRACT

A radio terminal (3) includes: a wireless transceiver (2001) configured to communicate with one or more radio stations using a licensed frequency and an unlicensed frequency; and at least one processor (2002). The at least one processor (2002) is configured to recognize whether LBT on the unlicensed frequency prior to uplink transmission needs to be performed, start the uplink transmission on the unlicensed frequency after performing the LBT when the LBT is needed, and start the uplink transmission without performing the LBT when the LBT is not needed. As a result, for example, the radio terminal can adaptively cope with the situation in which Listen Before Talk (LBT) by the radio terminal is needed and the situation in which it is not needed.

30 Claims, 30 Drawing Sheets

(51) Int. Cl.
| | |
|---|---|
| H04W 72/0446 | (2023.01) |
| H04W 72/21 | (2023.01) |
| H04W 72/23 | (2023.01) |
| H04W 74/00 | (2009.01) |
| H04W 76/27 | (2018.01) |
| H04W 74/0808 | (2024.01) |
| H04W 84/12 | (2009.01) |

(52) U.S. Cl.
CPC ......... H04W 72/21 (2023.01); H04W 74/006 (2013.01); H04W 76/27 (2018.02); *H04W 74/0808* (2013.01); *H04W 84/12* (2013.01)

(56) References Cited

U.S. PATENT DOCUMENTS

| | | | |
|---|---|---|---|
| 2006/0223448 | A1 | 10/2006 | Kruys |
| 2007/0060053 | A1 | 3/2007 | Haubrich et al. |
| 2011/0128895 | A1 | 6/2011 | Sadek et al. |
| 2013/0203458 | A1 | 8/2013 | Charbit et al. |
| 2013/0286937 | A1* | 10/2013 | Liu .................. H04W 48/16 370/328 |
| 2014/0301351 | A1 | 10/2014 | Gao et al. |
| 2014/0362780 | A1 | 12/2014 | Malladi et al. |
| 2015/0055541 | A1 | 2/2015 | Zhang et al. |
| 2015/0071060 | A1 | 3/2015 | Bhushan et al. |
| 2015/0163824 | A1* | 6/2015 | Krzymien ............ H04B 17/382 370/338 |
| 2015/0296463 | A1 | 10/2015 | Charbit et al. |
| 2016/0164644 | A1 | 6/2016 | Charbit et al. |
| 2017/0055181 | A1* | 2/2017 | Tiirola .................. H04L 5/0078 |
| 2017/0257875 | A1 | 9/2017 | Yilmaz et al. |
| 2017/0318607 | A1* | 11/2017 | Tiirola ..................... H04W 4/10 |
| 2018/0175975 | A1* | 6/2018 | Um ........................ H04W 72/23 |

FOREIGN PATENT DOCUMENTS

| | | |
|---|---|---|
| GB | 2498988 A | 8/2013 |
| JP | 2007-518358 A | 7/2007 |
| JP | 2009-194898 A | 8/2009 |
| JP | 2012-506674 A | 3/2012 |
| WO | 2004/112325 A1 | 12/2004 |
| WO | WO-2013/086659 A1 | 6/2013 |
| WO | WO-2013/112983 A2 | 8/2013 |
| WO | WO-2013/119095 A1 | 8/2013 |

OTHER PUBLICATIONS

3GPP RAN #62, RP-131635, Introducing LTE in Unlicensed Spectrum, Qualcomm, Ericsson, Dec. 3-7, 2013, 8 pages.
3GPP TR 36.842 V12.0.0 (Dec. 2013); 3rd Generation Partnership Project; Technical Specification Group Radio Access Network; Study on Small Cell enhancements for E-UTRA and E-UTRAN; Higher layer aspects; (Release 12), 71 pages.
3GPP TS 36.213 V12.3.0 (Sep. 2014); 3rd Generation Partnership Project; Technical Specification Group Radio Access Network; Evolved Universal Terrestrial Radio Access (E-UTRA); Physical layer procedures (Release 12); 212 pages.
3GPP TS 36.300 V12.3.0 (Sep. 2014); 3rd Generation Partnership Project; Technical Specification Group Radio Access Network; Evolved Universal Terrestrial Radio Access (E-UTRA); and Evolved Universal Terrestrial Radio Access Network; (E-UTRAN); Overall description; Stage 2; (Release 12); 215 pages.
3GPP TS 36.331 V12.3.0 (Sep. 2014); 3rd Generation Partnership Project; Technical Specification Group Radio Access Network; Evolved Universal Terrestrial Radio Access (E-UTRA); Radio Resource Control (RRC); Protocol specification; (Release 12); 378 pages.
3GPP TSG RAN WG1 Meeting #79, R1-144970; Nov. 17-21, 2014, Source: NTT DOCOMO, Views on issues related to LAA UL, Agenda Item: 6.3.2.2., 4 pages.
CATT "Listen Before Talk for LAA", 3GPP TSG RAN WG1 Meeting #79, R1-144625, San Francisco, USA, Nov. 17-21, 2014, 6 pages.
China Notification of Third Office Action issued in Chinese Patent Application No. 201580070734.X, dated Aug. 13, 2020, 16 pages.
Chinese Notification of the Second Office Action issued in Chinese Patent Application No. 201580070734.X, dated Mar. 27, 2020, 10 pages.
Extended European Search Report issued by the European Patent Office for European Application No. 15872116.7 dated Jul. 11, 2018 (8 pages).
Extended European Search Report issued in European Patent Application No. 19153838.8, dated May 10, 2019, 10 pages.
Huawei, HiSilicon; 3GPP TSG RAN WG1, Meeting #78bis, R1-143724, Review of existing unlicensed spectrum regulatory requirements affecting physical layer design, Oct. 6-10, 2014, 9 pages.
International Search Report corresponding to PCT/JP2015/003524, 2 pages, mail date Oct. 6, 2015.
Japan Notice of Reasons for Refusal issued in Japanese Patent Application No. 2016-565863, dated Jun. 25, 2019, 8 pages.
Japanese Notice of Reasons for Refusal issued in Japanese Patent Application No. 2019-075290, Apr. 7, 2020, 7 pages.
LG Electronics "Carrier Selection and Other Coexistence Methods", 3GPP TSG RAN WG1 Meeting #79, R1-144901, San Francisco, USA Nov. 17-21, 2014, 7 pages.
LG Electronics, 3GPP TSG RAN WG1 Meeting #78bis R1-144042, Candidate solutions for LAA operation, Agenda Item: 7.3.2.3, Oct. 6-10, 2014, 7 pages.
Panasonic "Regulatory Framework for 5 GHz", 3GPP TSG-RAN WG1 Meeting 78bis, R1-144111, Oct. 6-10, 2014, Ljubljana, Slovenia, pp. 1-5.
Samsung "Impact of Regulatory Requirements for 5GHz Band on LAA", 3GPP TSG-RAN WG1#78bis, R1-143877, Ljubljana, Slovenia, Oct. 6-10, 2014, pp. 1-3.
Sari Nielsen & Antti Toskala; 3GPP workshop on LTE in unlicensed spectrum, RWS-140002; Jun. 13, 2014, LTE in Unlicensed Spectrum: European Regulation and Co-existence Considerations; Nokia Corporation, NSN, 13 pages.
ZTE, "Analysis of PHY layer solutions for LAA design," 3GPP TSG RAN WG1 Meeting #79, R1-144825, Agenda Item 6.3.2.2, San Francisco, USA, Nov. 17-21, 2014 (8 pages).
ZTE, 3GPP TSG RAN WG1#78bis R1-143826, Regulatory requirements affecting RAN1 for licensed-assisted access using LTE, Oct. 6-10, 2014, 6 pages.
Japanese Office Communication for JP Application No. 2020-196742 mailed on Feb. 1, 2022 with English Translation.
CN Office Action for Chinese Patent Application No. 202110533256.9, mailed on Dec. 21, 2023 with English Translation.
CATT, "Discontinuous transmission on Scell for LAA", 3GPP TSG RAN WG1 Meeting #79, R1-144626, Nov. 8, 2014.

* cited by examiner

| TDD UL/DL CONFIGURATION | SUBFRMAE NUMBER n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |
 DOWNLINK SUBFRAME
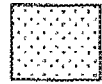 UPLINK SUBFRAME
 SPECIAL SUBFRAME
Fig. 9

| Uplink-Downlink Configuration | Downlink-to-Uplink Switch Point Periodicity | \multicolumn{10}{c}{Subframe Number} |
|---|---|---|---|---|---|---|---|---|---|---|---|

| Uplink-Downlink Configuration | Downlink-to-Uplink Switch Point Periodicity | 0 | 1 | 2 | 3 | 4 | 5 | 6 | 7 | 8 | 9 |
|---|---|---|---|---|---|---|---|---|---|---|---|
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Fig. 22

RADIO TERMINAL, RADIO STATION, AND METHOD PERFORMED THEREBY

CROSS-REFERENCE TO RELATED APPLICATIONS

This application is a continuation of U.S. patent application Ser. No. 15/534,712, entitled "RADIO TERMINAL, RADIO STATION, AND METHOD PERFORMED THEREBY," filed on Jun. 9, 2017, which is a national stage application of International Application No. PCT/JP2015/003524 entitled "RADIO TERMINAL, RADIO STATION, AND METHOD PERFORMED THEREBY," filed on Jul. 13, 2015, which claims the benefit of the priority of Japanese Patent Application No. 2014-262541 filed on Dec. 25, 2014, the disclosures of each of which are hereby incorporated by reference in their entirety.

TECHNICAL FIELD

The present application relates to a radio communication system in which a radio station performs communication with a radio terminal on an unlicensed frequency or a shared frequency and, more particularly, to Listen-Before-Talk (LBT) for uplink transmission.

BACKGROUND ART

Hereinafter, Radio frame structures used in 3rd Generation Partnership Project (3GPP) Release 8 (referred to as Long Term Evolution (LTE)) and subsequent releases will be described, and then carrier aggregation (CA) introduced in 3GPP Release 10 (which is referred to as LTE-Advanced) will be described. Further, Licensed Assisted Access (LAA) and Licensed Shared Access (LSA), which are currently being discussed in regard to 3GPP Release 13, will be described.

First, LTE time-frequency resources (radio resources) will be described. FIG. 21 shows an LTE radio frame structure. In 3GPP Release 8 and subsequent releases, two types of the radio frame structures are specified. One is referred to as a frame structure type 1, which is applied to frequency division duplex (FDD). The other one is referred to as a frame structure type 2, which is applied to Time division duplex (TDD). As shown in FIG. 21, in both frame structure type 1 and frame structure type 2, the length of one radio frame is 10 milliseconds and one radio frame consists of 10 subframes. In the case of TDD, the first five subframes (#0 to #4) and the last five subframes (#5 to #9) are each referred to as a half-frame. The length of one half-frame is 5 milliseconds. The length of one subframe is 1 millisecond. One subframe is divided into two slots of 0.5 milliseconds each. In the case of Normal cyclic prefix, one slot includes seven symbols (i.e., single carrier frequency division multiple access (SC-FDMA) symbols in uplink, and orthogonal frequency division multiplexing (OFDM) symbols in downlink) in the time domain. Accordingly, one subframe includes 14 symbols in the time domain.

FIG. 22 shows seven types of uplink/downlink configurations (TDD UL/DL configurations) supported by TDD LTE. In the case of TDD LTE, uplink subframes (UL subframes) and downlink subframes (DL subframes) coexist in one radio frame. The TDD UL/DL configuration indicates the arrangement of uplink and downlink subframes in one radio frame. In FIG. 22, "D" represents a DL subframe, "U" represents a UL subframe, and "S" represents a special subframe. In TDD LTE, any one of the TDD UL/DL configurations shown in FIG. 22 is repeatedly used in the period of the radio frame (i.e., 10 milliseconds).

The UL subframe is a subframe in which uplink (UL) transmission from a radio terminal (User Equipment (UE)) to a radio base station (eNodeB (eNB)) is performed and the DL subframe is a subframe in which downlink (DL) transmission from the eNB to the UE is performed. Switching from DL transmission (DL subframe) to UL transmission (UL subframe) is performed in the second subframe (i.e., subframes #1 and #6) in the half frame. FIG. 23 shows a configuration example of the special subframe. The special subframe is formed of a downlink pilot time slot (DwPTS) in which DL transmission is performed, a guard period (GP) in which no transmission is performed, and an uplink pilot time slot (UpPTS) in which uplink transmission is performed.

Moreover, 3GPP Release 10 has specified the Carrier Aggregation (CA) function that enables a UE to communicate with an eNB using a plurality of cells. Cells available to a UE in CA are limited to a plurality of cells of a single eNB (i.e., cells operated or managed by an eNB). The cells used by the UE in CA are categorized into a primary cell (PCell) that has already been used as a serving cell when CA is started and a secondary cell(s) (SCell(s)) that is used additionally or in a dependent manner. In the PCell, when a radio connection is (re-)established (Radio Resource Control (RRC) Connection Establishment, RRC Connection Re-establishment), Non Access Stratum (NAS) mobility information and security information (security input) are transmitted (see section 7.5 of Non-Patent Literature 1).

From a functional point of view, the introduction of CA has enabled high-speed communication. In practical usage, however, it is considered that it would be difficult to address the issue of a further increase in mobile traffic in the future due to limitations (shortage) of frequencies allocated to each operator. Accordingly, in the 3GPP standardization process, discussions on Unlicensed LTE that executes LTE with the use of an unlicensed frequency (unlicensed frequency band, unlicensed spectrum) have been started (Non-Patent Literature 2 and 3). Unlicensed LTE is also referred to as LTE-U or U-LTE and is hereinafter referred to as LTE-U.

As methods for achieving LTE-U, two methods, i.e., Licensed Assisted Access (LAA) in which the eNB performs communication with the UE on the unlicensed frequency in association with the licensed frequency (e.g., as SCell of CA) and Standalone (SA) in which the eNB performs communication with the UE only on the unlicensed frequency, are considered. The unlicensed frequency is, for example, 5 GHz band, which is also used by other systems such as radar systems and wireless LAN (WLAN or also referred to as WiFi). Therefore, with regard to the SA scheme in which communication is performed only on the unlicensed frequency, it would be difficult to implement sophisticated controls specified for LTE and thus the more feasible LAA scheme (also referred to as LA-LTE) has mainly been discussed. In the following description, LTE-U by the LAA scheme, in which CA using the licensed frequency and the unlicensed frequency is performed, will be mainly explained. The licensed frequency means a dedicated frequency allocated to a specific operator. The unlicensed frequency means a frequency that is not allocated to a specific operator or a shared frequency allocated to a plurality of operators. In the latter case, this frequency may be referred to as a licensed shared frequency, not an unlicensed frequency, and communication using this frequency is also referred to as a Licensed Shared Access (LSA). In the following description, frequencies other than licensed frequencies licensed only to any specific operators are collectively referred to as an unlicensed frequency.

LTE-U by the LAA scheme is executed basically in accordance with the sequence shown in FIG. 24. In this example, it is assumed that an eNB performs data transmission (or reception) with a UE #1 in a Cell #1 on a licensed frequency and in a cell #2 on an unlicensed frequency. Firstly, a radio connection is established between the eNB and the UE #1 in the Cell #1 (RRC Connection Establishment, 2401), and a bearer is established between a core network (Evolved Packet Core: EPC) and the UE #1 (not shown). That is, the Cell #1 is the PCell for the UE #1. When there is downlink (DL) user data (also referred to as User Plane (UP) data) to be transmitted to the UE #1 or when there is uplink (UL) user data that the UE #1 wants to transmit, the eNB transmits or receives this user data in the Cell #1 (DL (or UL) UP data transmission, 2402).

Next, when the eNB determines that it is efficient for the UE #1 to transmit and receive user data in the Cell #2 at some point (Trigger LTE-U for UE #1, 2403), the eNB transmits to the UE #1, in the Cell #1, control information about radio resource configuration for the Cell #2 (Radio Resource Configuration for Cell #2, 2404). This control information corresponds to a RadioResourceConfigDedicated Information Element (TE) and a RadioResourceConfigCommon IE transmitted in an RRC Connection Reconfiguration message of the LTE (Non-Patent Literature 4). The Cell #2 hereby becomes an SCell for the UE #1. When the user data is transmitted in the downlink, the eNB performs sensing in the Cell #2 to determine whether the Cell #2 is available (Perform channel sensing, 2405). Upon determining that the Cell #2 is available, the eNB transmits or receives user data to or from the UE #1 (DL (or UL) UP data transmission, 2406). As described above, through the use of the unlicensed frequency, it is expected that the throughput will be further improved or the cell capacity will be increased.

The aforementioned sensing in the aforementioned Block 2405 is referred to as Listen Before Talk (LBT) (Non-Patent Literature 2), where it is determined whether LTE-U by another operator or communication of another radio system (e.g., WLAN) on the target unlicensed frequency is performed nearby. The aforementioned sensing corresponds to, for example, Channel Availability Check (CAC) for radar systems and Clear Channel Assessment (CCA) executed by a WLAN Access Point (AP) (Patent Literature 1).

LBT (sensing) in the aforementioned Block 2405 is performed by the eNB and is mainly performed for frequency resources used for DL transmission prior to performing this DL transmission. This LBT is herein referred to as DL LBT. When downlink LAA (LAA DL) is performed, it is reasonable that the eNB performs DL LBT prior to DL transmission.

On the other hand, when uplink LAA (LAA UL) is performed as well, LBT may be required in order to meet regulatory requirements (regulatory conditions) and to achieve fair coexistence with other systems on the unlicensed frequency. LBT performed on frequency resources used for UL transmission prior to performing this UL transmission is herein referred to as UL LBT. Non-Patent Literature 5 discloses an option (Option 1) in which the UE performs UL LBT and an option (Option 2) in which the eNB performs UL LBT.

More specifically, in Option 1, the UE performs UL LBT after receiving an uplink grant (UL grant) from the eNB. If the unlicensed frequency channel for the UL transmission is idle (that is, if the channel is clear, is not busy, or is available), the UE starts the UL transmission. This way is in line with the regulatory requirements in many countries and regions and the sensing result is always reliable from UE point of view. In this option, however, the UE cannot execute transmission in accordance with the UL grant if the channel is not available due to the result of LBT, although the UE has successfully received the UL grant. In this case, the eNB may perform link adaptation aiming to increase the coding gain of the UL grant, although this remedy is not needed.

In Option 2, the eNB performs LBT (channel sensing) on the unlicensed frequency channel to be used by the UE for transmission and transmits the UL grant to the UE when this channel is idle. In response to receiving the UL grant, the UE starts the UL transmission without performing LBT. In this option, the eNB is able to control UL transmission of the UE. Since the uplink transmission is scheduled by the eNB in LTE, it may be appropriate that the eNB make decision on the UL transmission from LTE point of view. However, a large delay between LBT and the UL transmission is not preferable. In addition, the sensing result at the eNB side would not be aligned with actual interference situation at the UE side, and hence the sensing result in Option 2, in which the eNB performs LBT, may be less accurate than that in Option 1, in which the UE performs LBT.

CITATION LIST

Non-Patent Literature

[Non-Patent Literature 1] 3GPP TS 36.300 V12.3.0 (2014-09), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", September 2014

[Non-Patent Literature 2] 3GPP RP-131635, "Introducing LTE in Unlicensed Spectrum". Qualcomm, Ericsson, December 2013

[Non-Patent Literature 3] 3GPP workshop on LTE in unlicensed spectrum, RWS-140002, "LTE in Unlicensed Spectrum: European Regulation and Co-existence Considerations", Nokia, June 2014

[Non-Patent Literature 4] 3GPP TS 36.331 V12.3.0 (2014-09), "3rd Generation Partnership Project; Technical Specification Group Radio Access Network; Evolved Universal Terrestrial Radio Access (E-UTRA); Radio Resource Control (RRC); Protocol specification (Release 12)", September 2014

[Non-Patent Literature 5] 3GPP R1-144970, "Views on issues related to LAA UL", NTT DOCOMO, November 2014

[Non-Patent Literature 6] 3GPP TS 36.213 V12.3.0 (2014-09) "3rd Generation Partnership Project; Technical Specification Group Radio Access Network; Evolved Universal Terrestrial Radio Access (E-UTRA); Physical layer procedures (Release 12)", September 2014

[Non-Patent Literature 7] 3GPP TR 36.842 V12.0.0 (2013-12), "3rd Generation Partnership Project; Technical Specification Group Radio Access Network; Study on Small Cell enhancements for E-UTRA and E-UTRAN; Higher layer aspects (Release 12)", December 2013

Patent Literature

[Patent Literature 1] U.S. Pat. No. 7,443,821

SUMMARY OF INVENTION

Technical Problem

There are advantages and disadvantages in both of the Options 1 and 2 of UL LBT, as disclosed in Non-Patent Literature 5. Accordingly, whether to employ Option 1 or Option 2 or both of them may be determined for each country, each region, or each Public Land Mobile Network (PLMN) by comparing and balancing the advantages and the disadvantages of these Options 1 and 2. In other words, whether the UE should perform UL LBT may vary depending on, for example, the location (the country or the region) where the UE is located, the PLMN to which the UE is connected, the eNB to which the UE is connected.

To be more specific, the regulatory requirements for communication on unlicensed frequencies may be different for each country or region. Accordingly, although UL LBT by the UE is definitely needed in some countries or regions, UL LBT by the UE may not be needed in other countries or regions. Accordingly, it may be preferable that the UE supports both Option 1, in which the UE performs LBT, and Option 2, in which the eNB performs LBT.

Even when Option 1 in which the UE performs LBT is employed, the UE may be allowed to omit LBT under specific conditions or situations. Specifically, while the UE needs to perform UL LBT when there is or may be another system that uses the unlicensed frequency nearby, the UE may omit UL LBT when it is clear that there is no such system nearby.

Accordingly, one of objects to be attained by embodiments disclosed herein is to provide a radio terminal, a method, and a program capable of adaptively coping with both the situation in which LBT by the radio terminal is needed and the situation in which LBT by the radio terminal is not needed, and to provide an apparatus, a method, and a program that contribute to them.

Solution to Problem

In a first aspect, a radio terminal includes: a wireless transceiver configured to communicate with one or more radio stations using a licensed frequency and an unlicensed frequency; and at least one processor. The at least one processor is configured to recognize whether Listen Before Talk (LBT) on the unlicensed frequency prior to uplink transmission needs to be performed, start the uplink transmission on the unlicensed frequency after performing the LBT when the LBT is needed, and start the uplink transmission without performing the LBT when the LBT is not needed.

In a second aspect, a method performed by a radio terminal includes: recognizing whether Listen Before Talk (LBT) on an unlicensed frequency prior to uplink transmission needs to be performed; starting the uplink transmission on the unlicensed frequency after performing the LBT when the LBT is needed; and starting the uplink transmission without performing the LBT when the LBT is not needed.

In a third aspect, a program includes instructions (software codes) that, when loaded into a computer, cause the computer to perform the method according to the aforementioned second aspect.

In a fourth aspect, a radio station includes a memory and at least one processor that is coupled to the memory and is configured to transmit control information to a radio terminal, the control information being used by the radio terminal to recognize whether Listen Before Talk (LBT) on an unlicensed frequency prior to uplink transmission needs to be performed.

In a fifth aspect, a method performed by a radio station includes transmitting control information to a radio terminal, the control information being used by the radio terminal to recognize whether Listen Before Talk (LBT) on an unlicensed frequency prior to uplink transmission needs to be performed.

In a sixth aspect, a program includes instructions (software codes) that, when loaded into a computer, cause the computer to perform the method according to the aforementioned fifth aspect.

In a seventh aspect, a radio communication system includes one or more radio stations and a radio terminal configured to communicate with the one or more radio stations using a licensed frequency and an unlicensed frequency. The radio terminal is further configured to: recognize whether Listen Before Talk (LBT) on the unlicensed frequency needs to be performed; start uplink transmission on the unlicensed frequency after performing the LBT when the LBT is needed; and start the uplink transmission without performing the LBT when the LBT is not needed.

Advantageous Effects of Invention

According to the aforementioned aspects, it is possible to provide a radio terminal, a method, and a program capable of adaptively coping with both the situation in which LBT by the radio terminal is needed and the situation in which LBT by the radio terminal is not needed, and to provide an apparatus, a method, and a program that contribute to them.

BRIEF DESCRIPTION OF DRAWINGS

FIG. 9 is a table indicating a relation between reception of UL grant (PDCCH/EPDCCH) or ACK/NACK (PHICH) and PUSCH transmission in TDD LTE;

FIG. 22 is a table showing seven types of UL-DL configurations defined for TDD LTE;

DESCRIPTION OF EMBODIMENTS

Specific embodiments are described hereinafter in detail with reference to the drawings. The same or corresponding elements are denoted by the same reference signs throughout the drawings, and repetitive descriptions will be avoided for the sake of clarity.

Embodiments described below will be explained mainly using specific examples with regard to an Evolved Packet System (EPS) that contains LTE and System Architecture Evolution (SAE). However, these embodiments are not limited to being applied to the EPS and may also be applied to other mobile communication networks or systems such as a 3GPP UMTS, a 3GPP2 CDMA2000 system (1×RTT, HRPD (High Rate Packet Data)), a global system for mobile communications (GSM (registered trademark))/General packet radio service (GPRS) system, and a WiMAX system.

First Embodiment

First, some examples of Unlicensed LTE using an unlicensed frequency (Unlicensed frequency band, Unlicensed spectrum) according to a plurality of embodiments including this embodiment will be described. The Unlicensed LTE is also referred to as LTE-U or U-LTE and is hereinafter referred to as LTE-U. The unlicensed frequency includes a frequency that is used for, for example, radar systems and wireless LAN (WLAN or also referred to as WiFi) and includes frequencies other than licensed frequencies allocated only to any specific operators (i.e., service providers). The unlicensed frequency is, for example, but not limited to, 5 GHz band. Further, the plurality of embodiments described below can also be applied to a shared frequency (Shared frequency band, Shared spectrum) commonly allocated to a plurality of operators. In the following description, frequencies other than licensed frequencies are collectively referred to as the unlicensed frequency.

Figure 1A:
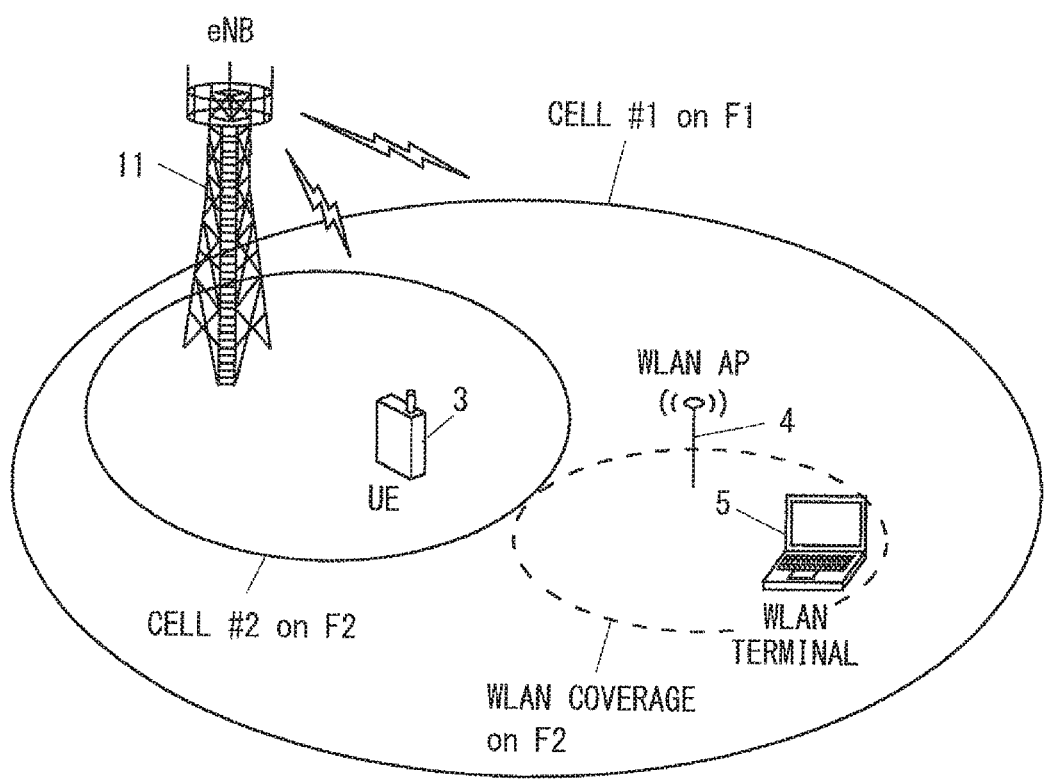
FIG. 1A is a diagram showing a configuration example of a radio communication system and another radio system according to several embodiments.
Figure 1B:
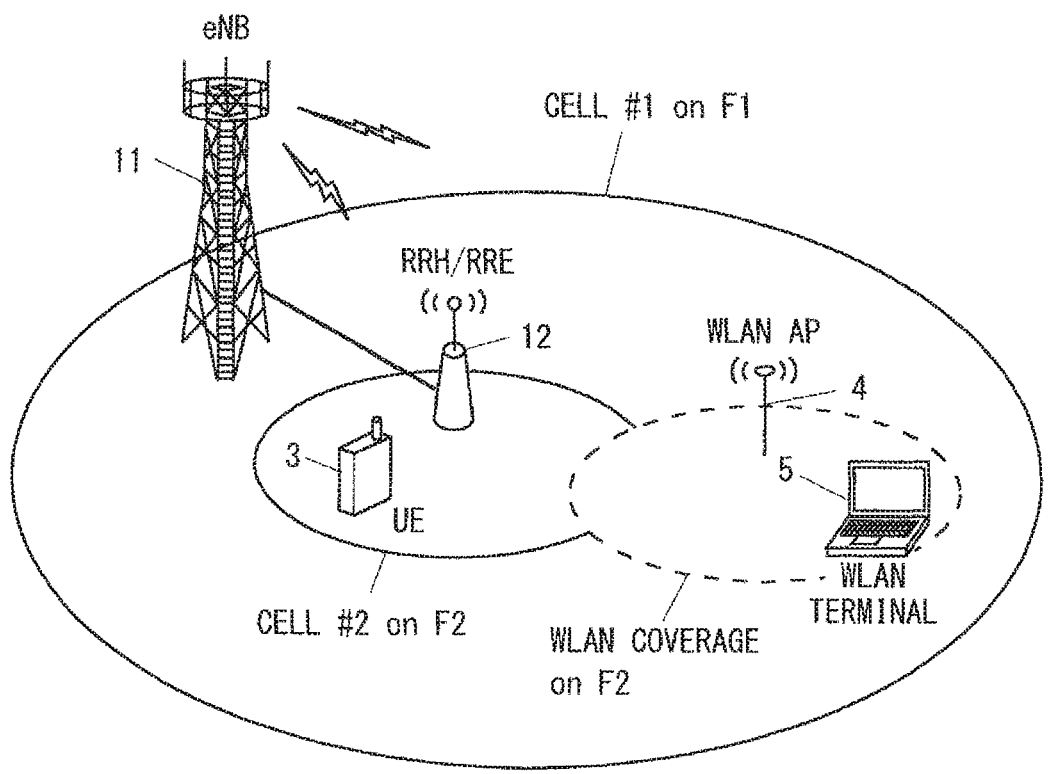
FIG. 1B is a diagram showing a configuration example of a radio communication system and another radio system according to several embodiments.
Figure 2:
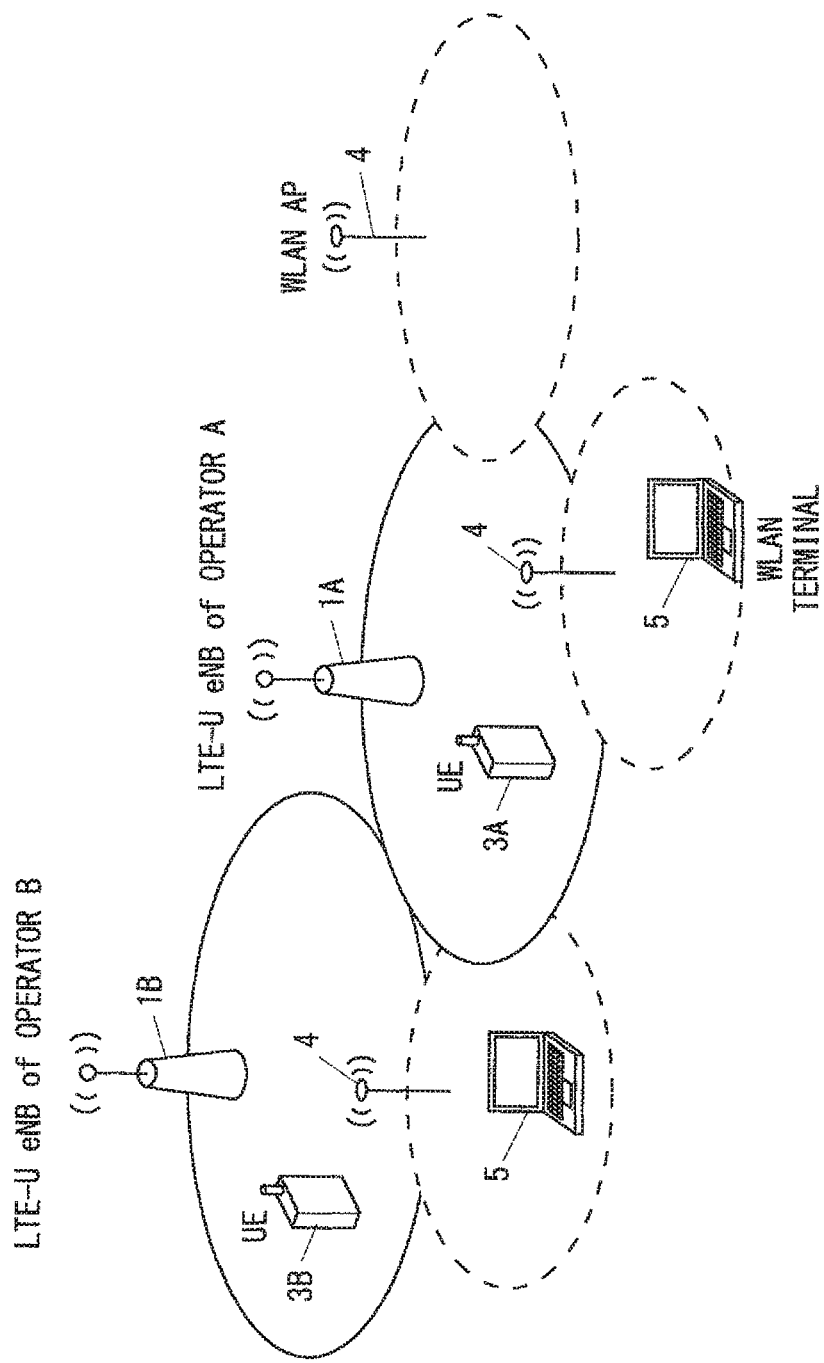
FIG. 2 is a diagram showing a configuration example of a radio communication system and another radio system according to several embodiments.

FIGS. 1A, 1B, and 2 are diagrams each showing a configuration example of a radio communication system of LTE-U and another system according to the plurality of embodiments including this embodiment. In the example shown in FIG. 1A, the radio communication system includes a radio base station (eNB) 11 and a radio terminal (UE) 3 of LTE. The eNB 11 and the UE 3 are configured to perform communication according to normal LTE on a licensed frequency (F1) and to perform communication according to LTE-U on an unlicensed frequency (F2). This unlicensed frequency (F2) is also used for communication between a wireless LAN access point (WLAN AP) 4 and a wireless LAN terminal (WLAN Terminal) 5. Besides the example shown in FIG. 1A, in the example shown in FIG. 1B, the LTE eNB 11 manages a remote base station (RRH or RRE) 12 and uses this remote base station 12 to perform communication according to LTE-U on the unlicensed frequency (F2).

The configuration shown in FIG. 1A and that shown in FIG. 1B may coexist in the same system. Further, FIGS. 1A and 1B show only a part of the radio communication system that is considered in this example. In reality, there are a plurality of eNBs and their RRHs/RREs and a plurality of UEs around the eNB 11, the RRH/RRE 12, and the UE 3, and a plurality of cells on the licensed frequency are managed by these eNBs and RRHs/RREs. Further, there may be a plurality of WLAN APs and a plurality of WLAN Terminals around the eNB 11, the RRH/RRE 12, and the UE 3. In the following description, the term "radio base station 1" or "LTE-U eNB 1" is used to indicate any eNB having the function of LTE-U. That is, the radio base station 1 or the LTE-U eNB 1 corresponds to the eNB 11 in the configuration shown in FIG. 1A and corresponds to the eNB 11 and the RRH/RRE 12 in the configuration shown in FIG. 1B. For the sake of convenience of explanation, only a node corresponding to the RRH/RRE 12 in the configuration shown in FIG. 1B may be referred to as the radio base station 1 or the LTE-U eNB 1.

FIG. 2 is a configuration example of the radio communication system of LTE-U and another radio communication system when the unlicensed frequency is particularly noted. There are a radio base station (LTE-U eNB-A) 1A having the function of LTE-U of one operator (service provider) A and a radio terminal (UE for Operator A: UE-A) 3A capable of being connected to a network of the operator A. There are also a radio base station (LTE-U eNB-B) 1B having the function of LTE-U of another operator (service provider) B and a radio terminal (UE for Operator B; UE-B) 3B capable of being connected to a network of the operator B. Each of the LTE-U eNBs 1A and 1B corresponds to, for example, the eNB 11 and the RRH/RRE 12 in FIGS. 1A and 1B and is also referred to as an LTE-U AP, which means an access point of LTE-U. Further, similar to FIGS. 1A and 1B, there are WLAN APs 4 and WLAN Terminals 5 around the LTE-U eNBs 1A and 1B and the UEs 3A and 3B.

In the aforementioned description and the following description, it is assumed that LTE-U is implemented using LAA (also referred to as LA-LTE). As already stated above, in LAA, the radio base station (LTE-U eNB) 1 and the radio terminal (UE) 3 perform carrier aggregation (CA) of a cell on the licensed frequency and a cell on the unlicensed frequency, use the cell on the licensed frequency as a primary cell (PCell), and use the cell on the unlicensed frequency as a secondary cell (SCell). As already stated above, LTE-U may be executed using a shared frequency (Shared frequency band, Shared spectrum) allocated to a plurality of operators (service providers) instead of using the unlicensed frequency. In this case, LTE-U may be achieved by the aforementioned LAA or a scheme similar to LAA. Alternatively, the LTE-U eNB 1 and the UE 3 may perform CA using a plurality of shared frequencies (e.g., two frequencies F3 and F4), and execute normal LTE in a PCell on one of two shared frequencies (F3) and execute LTE-U in an SCell on the other shared frequency (F4). As already stated above, LTE-U using a shared frequency is specifically referred to as Licensed Shared Access (LSA). Furthermore, the LTE-U eNB 1 and the UE 3 may perform CA using a shared frequency allocated to a plurality of operators (e.g., F3) and an unlicensed frequency in a narrow sense that is not allocated to any operator (e.g., F2 (e.g., 5 GHz band)), and execute normal LTE in a PCell on the shared frequency (F3) and execute LTE-U in an SCell on the unlicensed frequency in a narrow sense (F2).

In the plurality of embodiments including this embodiment, it is assumed that communication on the unlicensed frequency (or the shared frequency) executed in LTE-U is basically uplink (UL) transmission from the radio terminal 3 to the radio base station 1 in order to simplify explanation. Further, when the communication between the radio base station 1 and the radio terminal 3 on the unlicensed frequency can be performed only in the uplink, the unlicensed frequency does not substantially serve as a separate cell and only serves as an uplink secondary carrier (Secondary Component Carrier: SCC). In the plurality of embodiments including this embodiment, however, explanation will be basically given without considering whether the unlicensed frequency serves as a separate cell on its own and a supplementary explanation will be given as needed.

Figure 3:
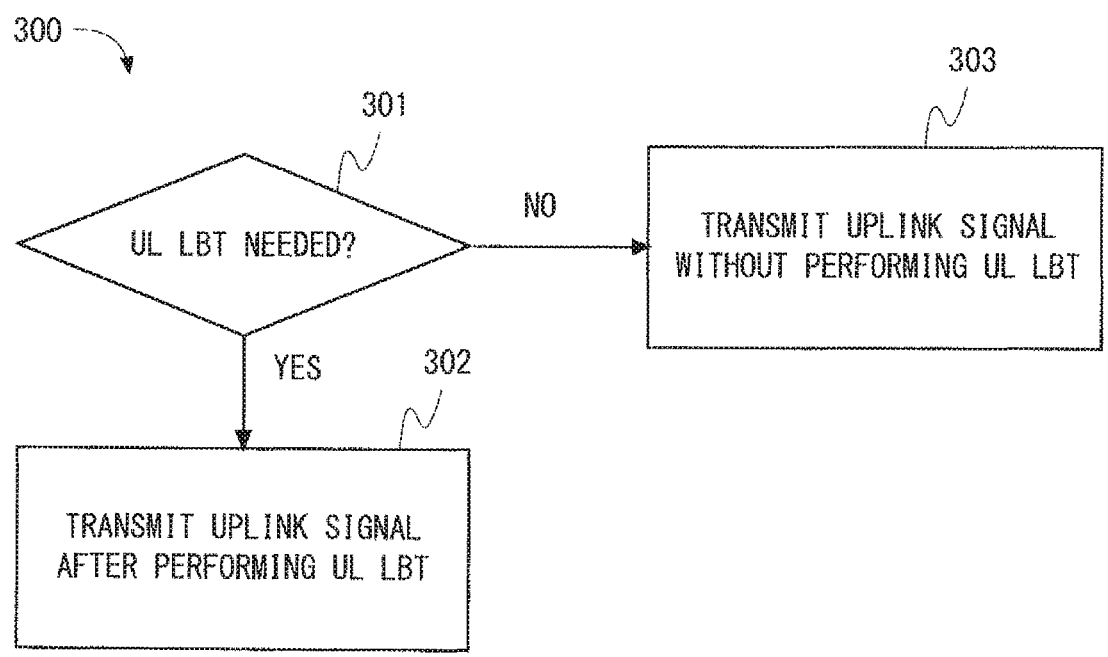
FIG. 3 is a flowchart showing one example of operations of a radio terminal according to a first embodiment.

The following provides a description of operations performed by the UE 3 according to this embodiment. FIG. 3 shows one example of operations performed by the UE 3 (Process 300). In Block 301, the UE 3 recognizes whether uplink Listen Before Talk (UL LBT) on the unlicensed frequency needs to be performed. As already stated above, the term "UL LBT" used herein means LBT performed on frequency resources used for UL transmission prior to performing this UL transmission. Accordingly, UL LBT may be performed in UL timing (or an UL subframe, an UL frame, an UL frequency, or an UL channel) or in DL timing. Further, as already stated above, LBT on the unlicensed frequency includes an operation of receiving (sensing) the unlicensed frequency prior to the transmission in order to detect whether communication on the unlicensed frequency by another system (e.g., LTE-U by another operator or another radio system (e.g., WLAN)) is performed nearby. LBT corresponds to, for example, Channel Availability Check (CAC) for radar systems, Clear Channel Assessment (CCA) executed by WLAN, and preamble detection. Further, it may be considered that LBT corresponds to, for example, at least one of detection of signal power (e.g., Power detection, Energy detection) and detection of a predetermined sequence (e.g., Preamble detection).

When UL LBT is needed (YES in Block 301), the UE 3 starts UL transmission on the unlicensed frequency after performing UL LBT (Block 302). Specifically, the UE 3 performs UL LBT and when an unlicensed frequency channel (resources) for UL transmission is available, the UE 3 starts UL transmission. The UE 3 does not perform the UL transmission, however, when the result of LBT indicates that the channel is not available.

On the other hand, when it has been recognized that UL LBT is not needed (NO in Block 301), the UE 3 starts the UL transmission without performing UL LBT (Block 303). That is, the UE 3 recognizes (determines) whether UL LBT needs to be performed by the UE 3, and then starts UL transmission after performing UL LBT when UL LBT is needed or starts UL transmission without performing UL LBT when UL LBT is not needed. Accordingly, the UE 3 is able to adaptively cope with both the situation in which UL LBT by the UE 3 is needed and the situation in which UL LBT by the UE 3 is not needed.

As already stated above, whether the UE 3 should perform UL LBT may vary depending on, for example, the location (the country or the region) where the UE 3 is located, the PLMN to which the UE 3 is connected, the eNB to which the UE is connected. The regulatory requirements for communication on the unlicensed frequency may be different for each country or region. Accordingly, although UL LBT by the UE 3 is definitely needed in some countries or regions, UL LBT by the UE 3 may not be necessarily performed in other countries or regions. The UE 3 according to this embodiment can adaptively cope, for example, with the regulatory requirements which are different for each country and region.

Further, the UE 3 may be allowed to omit LBT under specific conditions or situations. Specifically, while the UE 3 needs to perform UL LBT when there is or may be another system that uses the unlicensed frequency nearby, the UE 3 may omit UL LBT when it is clear that there is no such system nearby. The UE 3 according to this embodiment is able to selectively perform UL LBT, for example, only in the situation in which UL LBT needs to be performed by the UE 3.

In some implementations, the UE 3 may recognize (determine) whether UL LBT is needed with regard to transmission of one or more specific UL signals. Alternatively, the UE 3 may recognize (determine) whether UL LBT is needed with regard to all the UL transmission performed by the UE 3. That is, the UE 3 may recognize (determine) whether UL LBT is needed with regard to Physical Uplink Shared Channel (PUSCH) transmission, Physical Random Access Channel (PRACH) transmission (i.e., Random Access Preamble), Physical Uplink Control Channel (PUCCH) transmission (e.g., HARQ ACK/NACK, CQI reporting), Sounding Reference Signal (SRS) transmission, or another control signal (e.g., short control signaling (SCS)), or any combination thereof.

In some implementations, the UE 3 may recognize (determine) whether UL LBT is needed per UL transmission to be performed in the unlicensed frequency channel. For example, every time the UE 3 receives an UL grant from the eNB 1 via a DL control channel (e.g., Physical Downlink Control Channel (PDCCH) or enhanced PDCCH (EPDCCH)), the UE 3 may recognize whether UL LBT is needed for PUSCH transmission corresponding to the received UL grant. Furthermore or alternatively, every time the UE 3 receives ACK/NACK regarding an uplink hybrid automatic repeat request (HARQ) process from the eNB 1 via a DL control channel (e.g., Physical Hybrid ARQ Indicator Channel (PHICH)), the UE 3 may recognize whether UL LBT is needed for PUSCH retransmission corresponding to the received ACK/NACK. Using such an operation, the UE 3 is able to perform a fine determination on a per UL transmission basis, whereby it is possible to suppress execution of unnecessary UL LBT more efficiently.

In some implementations, the UE 3 may recognize (determine) whether UL LBT is needed per configuration of periodic UL transmission or semi-persistent UL resource allocation. The periodic UL transmission and the semi-persistent UL resource allocation include a plurality of UL transmissions on predetermined radio resources. For example, every time the UE 3 receives from the eNB 1 the Semi-Persistent Scheduling (SPS) configuration including configuration information regarding the SPS, the UE 3 may recognize whether UL LBT is needed for periodic UL transmissions in accordance with the SPS. Furthermore or alternatively, every time the UE 3 receives an SPS grant to activate the SPS from the eNB 1, the UE 3 may recognize whether UL LBT is needed for periodic UL transmissions in accordance with the SPS. Using such an operation, when the UE 3 has determined that UL LBT with regard to the SPS configuration is not needed, the UE 3 is able to omit UL LBT in the plurality of UL transmissions scheduled to the UE 3 by the SPS. The SPS is mainly used for scheduling of real-time communication packets such as a voice call service and a video service. Accordingly, omission of unnecessary UL LBT may be more preferable for UL transmissions scheduled to the UE 3 by the SPS. When UL LBT is omitted regarding the SPS configuration, it may be omitted only for a new transmission (HARQ initial transmission) or may be omitted for new transmission and HARQ retransmissions.

In some implementations, the UE 3 may recognize (determine) whether UL LBT is needed per configuration of a cell or component carrier that uses the unlicensed frequency (e.g., Cell #2 in FIGS. 1A and 1B). For example, every time the UE 3 receives from the eNB 1 system information (System Information Block (SIB)) broadcasted in the cell on the licensed frequency (e.g., Cell #1 in FIGS. 1A and 1B) or the cell on the unlicensed frequency (e.g., Cell #2 in FIGS. 1A and 1B), the UE 3 may determine whether UL LBT on the unlicensed frequency is needed. Furthermore or alternatively, every time the UE 3 receives dedicated signaling (e.g., RRC Connection Reconfiguration message) regarding the configuration of the cell (or component carrier) on the unlicensed frequency, the UE 3 may determine whether UL LBT on the unlicensed frequency is needed. Using such an operation, the UE 3 is able to perform a determination on a per cell (or component carrier) basis, whereby it is possible to comprehensively suppress not needed UL LBT and to reduce load due to the frequent determination of the necessity of UL LBT.

The UE 3 may appropriately combine the determinations of the necessity of UL LBT on a per UL transmission basis, on a per SPS basis, and on a per cell basis.

Figure 4:
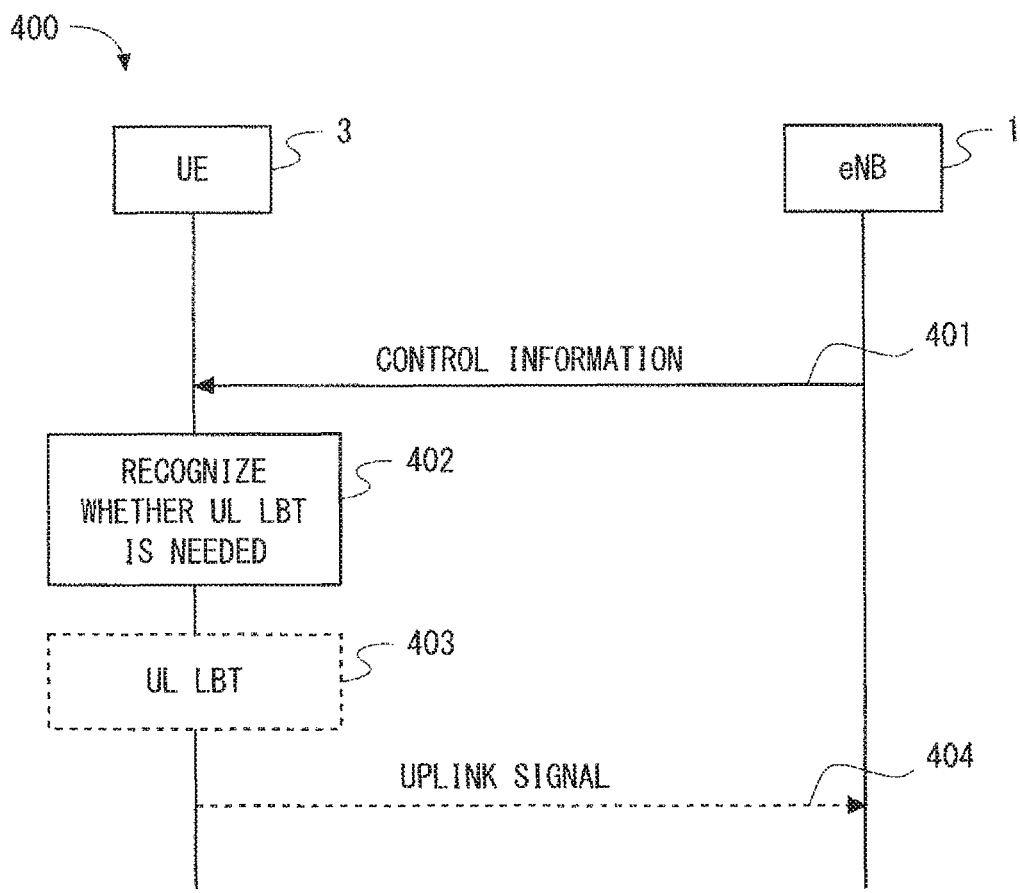
FIG. 4 is a sequence diagram showing one example of operations of a radio base station and a radio terminal according to the first embodiment.

In some implementations, the UE 3 may recognize, based on control information received from the eNB 1, whether UL LBT needs to be performed by the UE 3. Using such an operation, the eNB 1 is able to control whether the UE 3 should execute UL LBT by adjusting the content of the control information. FIG. 4 shows one example of operations of the eNB 1 and the UE 3 (Process 400). In Block 401, the eNB 1 transmits the control information to the UE 3. The control information is used by the UE 3 to recognize whether the UE 3 needs to perform UL LBT on the unlicensed frequency.

The eNB 1 may transmit the control information via the serving cell of the UE 3 on the licensed frequency (e.g., Cell #1 in FIGS. 1A and 1B), transmit the control information via the cell on the unlicensed frequency (e.g., Cell #2 in FIGS. 1A and 1B), or transmit the control information via both of these cells. The cell on the unlicensed frequency may be a DL carrier (e.g., SIB2 linked DL carrier) associated with a UL carrier for which the determination of the necessity of UL LBT is performed.

The eNB 1 may transmit the control information via system information (SIB) or dedicated signaling (e.g., MAC-MainConfig or PhysicalConfigDedicated in an RRC Connection Reconfiguration message). Furthermore or alternatively, the eNB 1 may transmit the control information, via a DL control channel (PDCCHEPDCCH), together with scheduling information (UL grant) indicating radio resources allocated to the UL signal. Furthermore or alternatively, the eNB 1 may transmit the control information together with HARQ ACK/NACK via a DL control channel (PHICH). NACK transmission via a PHICH triggers PUSCH retransmission by the UE 3.

In Block 402, the UE 3 recognizes (determines), based on the control information received from the eNB 1, whether UL LBT needs to be performed by the UE 3. When UL LBT is needed, the UE 3 starts UL transmission on the unlicensed frequency (Block 404) after performing UL LBT (Block 403). That is, the UE 3 performs UL LBT (Block 403), performs UL transmission on the unlicensed frequency when the unlicensed frequency channel (resources) for the UL transmission is available (Block 404), but does not perform UL transmission when it is not available. On the other hand, when the UE 3 has recognized that UL LBT is not needed, the UE 3 performs UL transmission without performing UL LBT (Block 404). Blocks 403 and 404, which are shown by dashed lines in FIG. 4, indicate that these processing are not performed under certain conditions.

In some implementations, the control information to be used by the UE 3 to recognize whether the UE 3 needs to perform UL LBT on the unlicensed frequency may be transmitted to the UE 3, on the user plane, from a network entity (e.g., an OAM server or a Regulation Data base) arranged in the PLMN or in an external network. Furthermore or alternatively, the control information may be transmitted to the UE 3 from an entity in a core network (e.g., a Mobility Management Entity (MME)) via a control message (e.g., NAS message).

The control information transmitted to the UE 3 from the eNB 1 or another network entity may include one or both of "information regarding necessity of UL LBT" and "information regarding the regulatory requirements for radio communication on the unlicensed frequency". Specific examples of these information elements will be described in the following embodiments.

Second Embodiment

This embodiment provides a specific example of the processing performed by the UE and the eNB. A configuration example of a radio communication system according to this embodiment is the same as the configuration examples shown in FIGS. 1A, 1B, and 2 described with regard to the first embodiment. In this embodiment, the UE 3 operates to: recognize, based on control information received from the eNB 1, whether UL LBT needs to be performed by the UE 3; perform UL transmission on the unlicensed frequency after UL LBT when UL LBT is needed: and perform UL transmission on the unlicensed frequency without performing UL LBT when UL LBT is not needed.

This control information, which the UE 3 receives from the eNB 1, includes information regarding necessity of UL LBT. For example, the information regarding necessity of UL LBT may explicitly indicate whether UL LBT needs to be performed. More specifically, the information regarding necessity of UL LBT may include at least one of the following information elements:

Information indicating whether LBT is needed (e.g., Flag);
Information indicating that LBT is needed (or not needed) (e.g., Boolean); and
Information indicating a predetermined condition to determine cases in which LBT is needed (or not needed).

The information indicating the predetermined condition to determine cases in which LBT is needed (or not needed) may indicate that LBT is needed (or not needed) when the predetermined condition is satisfied. This predetermined condition may relate to at least one of capability of the UE 3 (UE capability), a network to which the UE 3 is connected (or in which the UE 3 is registered), a frequency that is used for the UL transmission, and a peripheral system or network. In one example, the UE 3 may recognize that LBT is needed (or not needed) when the capability of the UE 3 satisfies an indicated predetermined condition (e.g., UE Power class or support of LBT). The UE 3 may recognize that LBT is needed (or not needed) when the network to which the UE 3 is connected (in which the UE 3 is registered) satisfies a predetermined condition (e.g., a PLMN ID (list of PLMN IDs)). The UE 3 may recognize that LBT is needed (or not needed) when the frequency that is used for the UL transmission satisfies a predetermined condition (e.g., an Absolute Radio Frequency Channel Number (ARFCN), or a frequency index). The UE 3 may recognize that LBT is needed (or not needed) when another system or network that the UE 3 has detected satisfies a predetermined condition (e.g., a WLAN Service Set Identifier (SSID), a Basic SSID (BSSID), an Extended SSID (ESSID), a Homogenous Extended Service Set Identifier (HESSID), or an access point name). When the predetermined condition is related to WLAN, the aforementioned information regarding WLAN (e.g., SSID, BSSID, ESSID, HESSID, or access point name) may be the one transmitted by system information (SIB17) used for traffic control between LTE and WLAN (traffic steering between E-UTRAN and WLAN).

As will be understood from the aforementioned description, in this embodiment, the UE 3 operates to: recognize, based on the "information regarding necessity of UL LBT" received from the eNB 1, whether UL LBT needs to be performed; perform UL transmission on the unlicensed frequency after UL LBT when UL LBT is needed; and perform UL transmission on the unlicensed frequency without performing UL LBT when UL LBT is not needed. Accordingly, the UE 3 is able to adaptively cope with both the situation in which UL LBT by the UE 3 is needed and the situation in which UL LBT by the UE 3 is not needed. Further, the eNB 1 is able to control whether the UE 3 should execute UL LBT by adjusting the content of "information regarding necessity of UL LBT".

Figure 5:
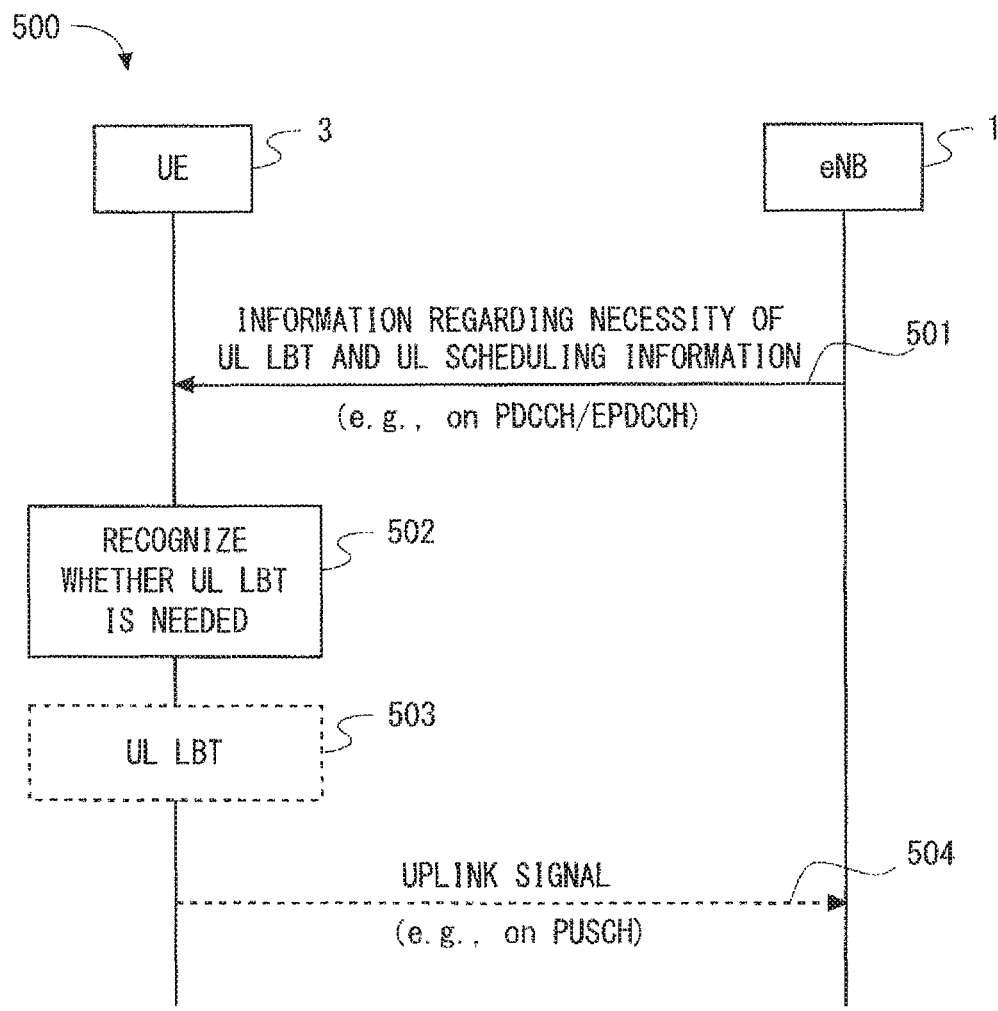
FIG. 5 is a sequence diagram showing one example of operations of a radio base station and a radio terminal according to a second embodiment.

FIG. 5 is a sequence diagram showing one example of operations of the eNB 1 and the UE 3 (Process 500). In Block 501, the eNB 1 transmits the information regarding necessity of LBT (e.g., Flag or Boolean) to the UE 3 together with uplink scheduling information (UL grant) on a PDCCH/EPDCCH. The eNB 1 may first transmit the information regarding necessity of LBT on a PDCCH/EPDCCH different from the PDCCH/EPDCCH on which the UL grant is transmitted. In this case, the eNB 1 may transmit these PDCCHs/EPDCCHs in cells different from each other. The eNB 1 may transmit one or more PDCCHs/EPDCCHs in the cell on the unlicensed frequency or in the cell on the licensed frequency (e.g., PCell).

In Block 502, the UE 3 recognizes (determines), based on the information regarding necessity of LBT received from the eNB 1, whether UL LBT needs to be performed by the UE 3. When UL LBT is needed, the UE 3 performs UL LBT (Block 503), then performs UL data transmission (PUSCH transmission) on the unlicensed frequency in accordance with the UL grant when the unlicensed frequency channel (resources) for the UL transmission is available (Block 504), but does not perform the UL data transmission when this channel is not available. On the other hand, when the UE 3 has been recognized that UL LBT is not needed, the UE 3 performs UL data transmission (PUSCH transmission) on the unlicensed frequency without performing UL LBT (Block 504). Blocks 503 and 504, which are shown by dashed lines in FIG. 5, indicate that these processing are not performed under certain conditions.

In Block 503, the UE 3 may perform LBT based on LBT configuration information that has been specified in the specification. Alternatively, the eNB 1 may transmit the LBT configuration information to the UE 3 in advance and the UE 3 may perform LBT based on the received configuration information. In this case, the eNB 1 may transmit the configuration information via system information (SIB) or via dedicated signaling (RRC Connection Reconfiguration message).

In the example shown in FIG. 5, the UE 3 receives the control information (information regarding necessity of LBT) together with the UL grant. The UE 3 is therefore able to recognize (determine) whether UL LBT is needed per UL transmission to be performed in the unlicensed frequency channel. Using such an operation, the UE 3 is able to perform fine determination on a per UL transmission basis, whereby it is possible to suppress execution of unnecessary UL LBT more efficiently.

In Block 501 in FIG. 5, the eNB 1 may transmit the information indicating the predetermined condition to determine cases in which LBT is needed (or not needed). In this case, the UE 3 may determine, in Block 502, whether the predetermined condition indicated by the eNB 1 is satisfied, and recognize that UL LBT by the UE 3 is needed (or not needed) when the predetermined condition is satisfied.

The series of operations of the UE 3 related to the example shown in FIG. 5 can be summarized as follows:
if the uplink grant for this TTI and this serving cell has been received on the (e)PDCCH:
(and) if the (e)PDCCH content indicates the necessity of LBT:
the UE 3 performs LBT;
the UE 3 sends the uplink grant and the related HARQ information to the HARQ entity for this TTI;
else:
the UE 3 sends the uplink grant and the related HARQ information to the HARQ entity for this TTI.

Alternatively, the series of operations of the UE 3 related to the example shown in FIG. 5 can be summarized as follows:
if the (e)PDCCH indicates new transmission (UL) on the unlicensed frequency:
(and) if the (e)PDCCH content indicates the necessity of LBT:
the UE 3 performs LBT.

Figure 6:
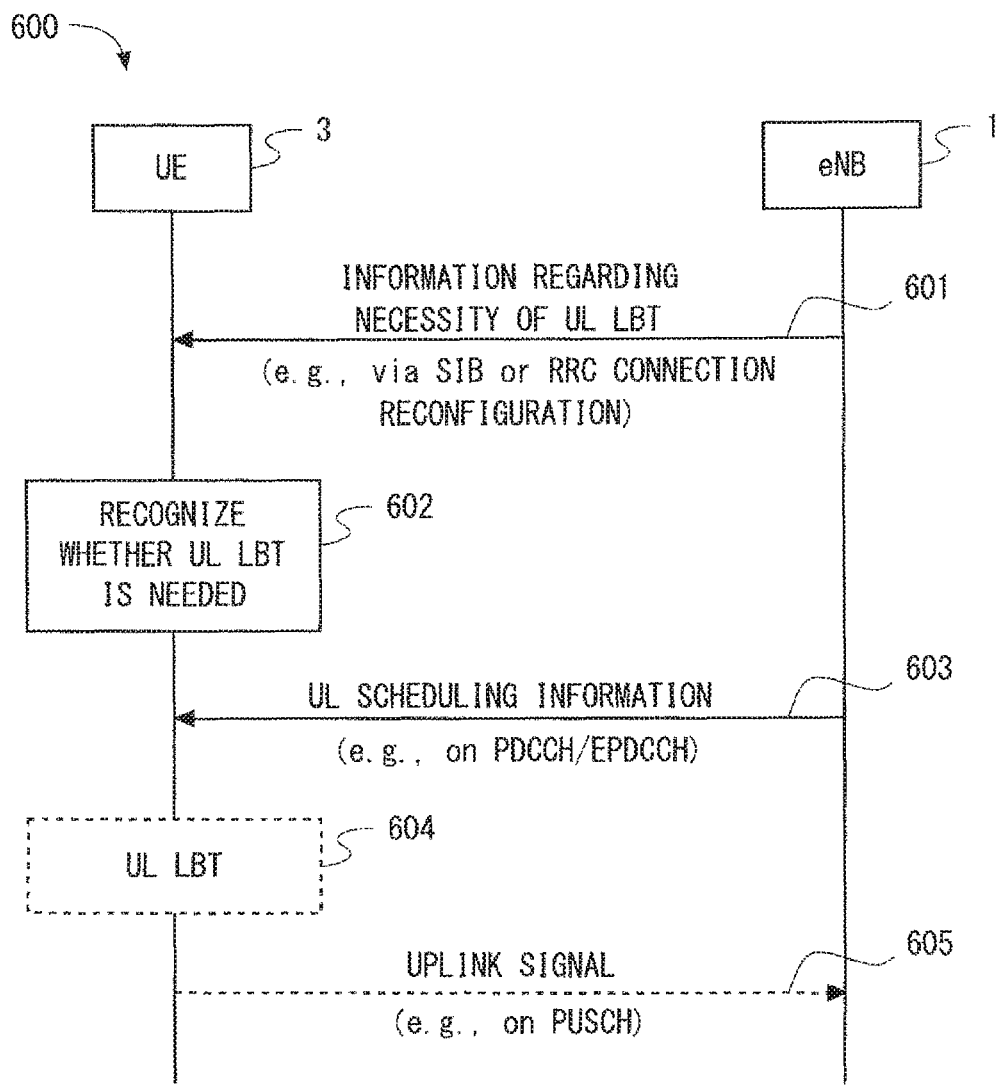
FIG. 6 is a sequence diagram showing one example of operations of the radio base station and the radio terminal according to the second embodiment.

FIG. 6 is a sequence diagram showing one example of operations of the eNB 1 and the UE 3 (Process 600). In Block 601, the eNB 1 transmits the information regarding necessity of LBT (e.g., Flag or Boolean) to the UE 3 via system information (SIB) or dedicated signaling (RRC Connection Reconfiguration message). In Block 602, the UE 3 recognizes (determines), based on the information regarding necessity of LBT received from the eNB 1, whether UL LBT needs to be performed by the UE 3.

In Block 603, the eNB 1 transmits UL scheduling information (UL grant) to the UE 3 on a PDCCH/EPDCCH. The eNB 1 may transmit this PDCCH/EPDCCH on (a cell of) the unlicensed frequency or on (a cell of) the licensed frequency.

When the UE 3 has been recognized in Block 602 that UL LBT is needed, the UE 3 performs UL LBT in response to receiving the UL grant (Block 604). Then the UE 3 performs UL data transmission (PUSCH transmission) on the unlicensed frequency in accordance with the UL grant when the unlicensed frequency channel (resources) for the UL transmission is available (Block 605), but does not perform UL transmission when the channel is not available. On the other hand, when the UE 3 has been recognized that UL LBT is not needed in Block 602, the UE 3 performs UL data transmission (PUSCH transmission) on the unlicensed frequency without performing UL LBT (Block 605). Blocks 604 and 605, which are shown by dashed lines in FIG. 6, indicate that these processing are not performed under certain conditions.

In the example shown in FIG. 6, the UE 3 receives the control information (the information regarding necessity of LBT) via system information (SIB) or dedicated signaling (RRC Connection Reconfiguration message). The UE 3 is therefore able to recognize (determine) whether UL LBT is needed per configuration of a cell or component carrier that uses the unlicensed frequency. Using such an operation, the UE 3 is able to perform determination on a per cell (or component carrier) basis, whereby it is possible to comprehensively suppress unnecessary UL LBT and to reduce load due to the frequent determination of the necessity of UL LBT.

In Block 601 in FIG. 6, the eNB 1 may transmit the information indicating the predetermined condition to determine cases in which LBT is needed (or not needed). In this case, the UE 3 may determine, in Block 602, whether the predetermined condition indicated by the eNB 1 is satisfied, and recognize that UL LBT by the UE 3 is needed (or not needed) when the predetermined condition is satisfied.

The series of operations of the UE 3 related to the example shown in FIG. 6 can be summarized as follows:
if the uplink grant for this TTI and this serving cell has been received on the (e)PDCCH:
(and) if the necessity of LBT has been indicated by RRC:
the UE 3 performs LBT; and
the UE 3 sends the uplink grant and the related HARQ information to the HARQ entity for this TTI;
else:
the UE 3 sends the uplink grant and the related HARQ information to the HARQ entity for this TT1.

In the specific examples described with reference to FIGS. 5 and 6, the explanation has been given regarding the UL data transmission. These specific examples may be performed for UL signal transmission other than the UL data transmission. For example, the UL scheduling information transmitted in Block 501 in FIG. 5 and Block 603 in FIG. 6 may be replaced by a RACH preamble transmission request (PDCCH order) transmitted by the eNB 1 and the uplink signal (PUSCH) transmitted in Block 504 in FIG. 5 and Block 605 in FIG. 6 may be replaced by a PRACH. Alternatively, the UE 3 may always omit LBT without recognizing the necessity of UL LBT with regard to transmission of the UL control signals (e.g., SRS, PRACH, or PUCCH), and transmit these control signals on the radio resources assigned by the eNB 1.

Third Embodiment

This embodiment provides a specific example of the processing performed by the UE and the eNB. Configuration examples of a radio communication system according to this embodiment are the same as those shown in FIGS. 1A, 1B, and 2 described with regard to the first embodiment. In this embodiment, the UE 3 operates to: recognize, based on control information received from the eNB 1, whether UL LBT needs to be performed by the UE 3; perform UL transmission on the unlicensed frequency after UL LBT when UL LBT is needed; and performs UL transmission on the unlicensed frequency without performing UL LBT when UL LBT is not needed.

This control information, which the UE 3 receives from the eNB 1, includes information regarding regulations for radio communication on the unlicensed frequency. The information regarding the regulations may indicate a first period in which it is allowed to transmit the UL signal without performing UL LBT. More specifically, the information regarding the regulations may include at least one of the following information elements:

Maximum continuous use time (maximum occupancy period, maximum channel occupancy time, or maximum transmission duration) allowed after it is determined in LBT that radio resources are available;

Continuous use time (occupancy period, channel occupancy time, or transmission duration) allowed after a predetermined signal is received;

Duty cycle information (e.g., duty cycle [%], observation period [ms], or duty cycle type (continuous duty or intermittent duty)); and LBT determination information (e.g., LBT type (e.g., energy detection or preamble detection), LBT for LAA only, LBT threshold for LAA, LBT for WLAN only, LBT threshold for WLAN, or CCA time).

The UE 3 may operate as follows when the information regarding the regulations indicates the first period in which it is allowed to transmit the UL signal without performing UL LBT (e.g., the maximum continuous use time allowed after it is determined in LBT that radio resources are available or the continuous use time allowed after the predetermined signal is received).

In one implementation, when the time elapsed after UL LBT has been previously executed is shorter than the first period (i.e., the continuous use time allowed after it is determined in LBT that radio resources are available), the UE 3 may recognize that new UL LBT is not needed. The previous UL LBT may be executed either by the UE 3 or by the eNB 1. The time elapsed after UL LBT has been previously executed corresponds to, for example, time elapsed after it is determined in UL LBT that the radio resources are available or time elapsed from the subframe next to the subframe in which it is determined in UL LBT that radio resources are available. Further, the determination regarding whether the elapsed time is shorter than the first period may be performed, for example, by determining whether the timing (time or subframe) when the UL transmission is actually performed is shorter than the first period (or is within the first period), or by determining whether the timing (time or subframe) when preparation for the UL transmission is made is shorter than the first period (or is within the first period).

In one implementation, when the period from the transmission of the predetermined signal by the eNB 1 or the reception of the predetermined signal by the UE 3 to the UL transmission is shorter than the first period (i.e., the continuous use time allowed after the predetermined signal is received), the UE 3 may recognize that UL LBT is not needed. This predetermined signal may be scheduling information indicating allocation of radio resources for UL transmission (e.g., UL grant by a PDCCH/EPDCCH), a request message for requesting UL transmission (e.g., HARQ ACK/NACK via a PHICH), or a predetermined beacon. The period from the reception of the predetermined signal to the UL transmission corresponds to, for example, the period from the timing (time or subframe) when the UE 3 has received the predetermined signal to the UL transmission or the period from the timing (time or subframe) when the UE 3 has recognized the information included in the signal by receiving the predetermined signal and demodulating the received signal to the UL transmission. Further, the determination whether this period is shorter than the first period may be performed based on, for example, whether the timing (time or subframe) when the UL transmission is actually performed is shorter than the first period (or is within the first period) or whether the timing (time or subframe) when preparation for the UL transmission is made is shorter than the first period (or is within the first period).

In other words, in one implementation, if the UE 3 received the predetermined signal (e.g., PDCCH for UL grant) in the subframe n and time has not yet elapsed (after the reception) more than the first period (e.g., the maximum transmission duration), the UL signal (e.g., PUSCH in accordance with the UL grant) may be transmitted without executing LBT.

In other words, in one implementation, if the UE 3 received the predetermined signal (e.g., PDCCH for UL grant) in the subframe n and the first period (e.g., the maximum transmission duration) is smaller than k+1, the UE 3 needs to perform LBT in the current subframe n+k before transmitting the UL signal (e.g., PUSCH in accordance with the UL grant). The symbol n indicates the subframe number (an integer from 0 to 9) and k is a positive integer.

Further, in other words, in one implementation, the UE 3 may recognize that UL LBT is not needed when the period from the timing (subframe) of the UL transmission back to the transmission of the predetermined signal by the eNB 1 or the reception of the predetermined signal by the UE 3 is shorter than the first period (i.e., the continuous use time allowed after the predetermined signal is received). That is, when the UE 3 has received the predetermined signal within a period shorter than the first period from the timing of the UL transmission, the UE 3 may recognize that UL LBT is not needed.

In other words, in one implementation, if the UE 3 has received the predetermined signal (e.g., PDCCH for UL grant) within a period shorter than the first period (e.g., the maximum transmission duration) from the current subframe n, the UL signal (e.g., PUSCH in accordance with the UL grant) may be transmitted without executing LBT.

In other words, in one implementation, if the UE 3 has received the predetermined signal (e.g., PDCCH for UL grant) in the subframe n−k and the first period (e.g., the maximum transmission duration) is smaller than k+1, the UE 3 needs to perform LBT in the current subframe n before transmitting the UL signal (e.g., PUSCH in accordance with the UL grant). The symbol n indicates the subframe number (an integer from 0 to 9) and k denotes a positive integer.

As will be understood from the aforementioned description, in this embodiment, the UE 3 operates to: recognize, based on the "information regarding regulations for radio communication on the unlicensed frequency" received from the eNB 1, whether UL LBT needs to be performed; perform UL transmission on the unlicensed frequency after UL LBT when UL LBT is needed; and perform UL transmission on the unlicensed frequency without performing UL LBT when UL LBT is not needed. Accordingly, the UE 3 is able to adaptively cope with both the situation in which UL LBT by the UE 3 is needed and the situation in which UL LBT by the UE 3 is not needed. Further, the eNB 1 is able to control whether the UE 3 should execute UL LBT by adjusting the content of the "information regarding regulations for radio communication on the unlicensed frequency".

Figure 7:
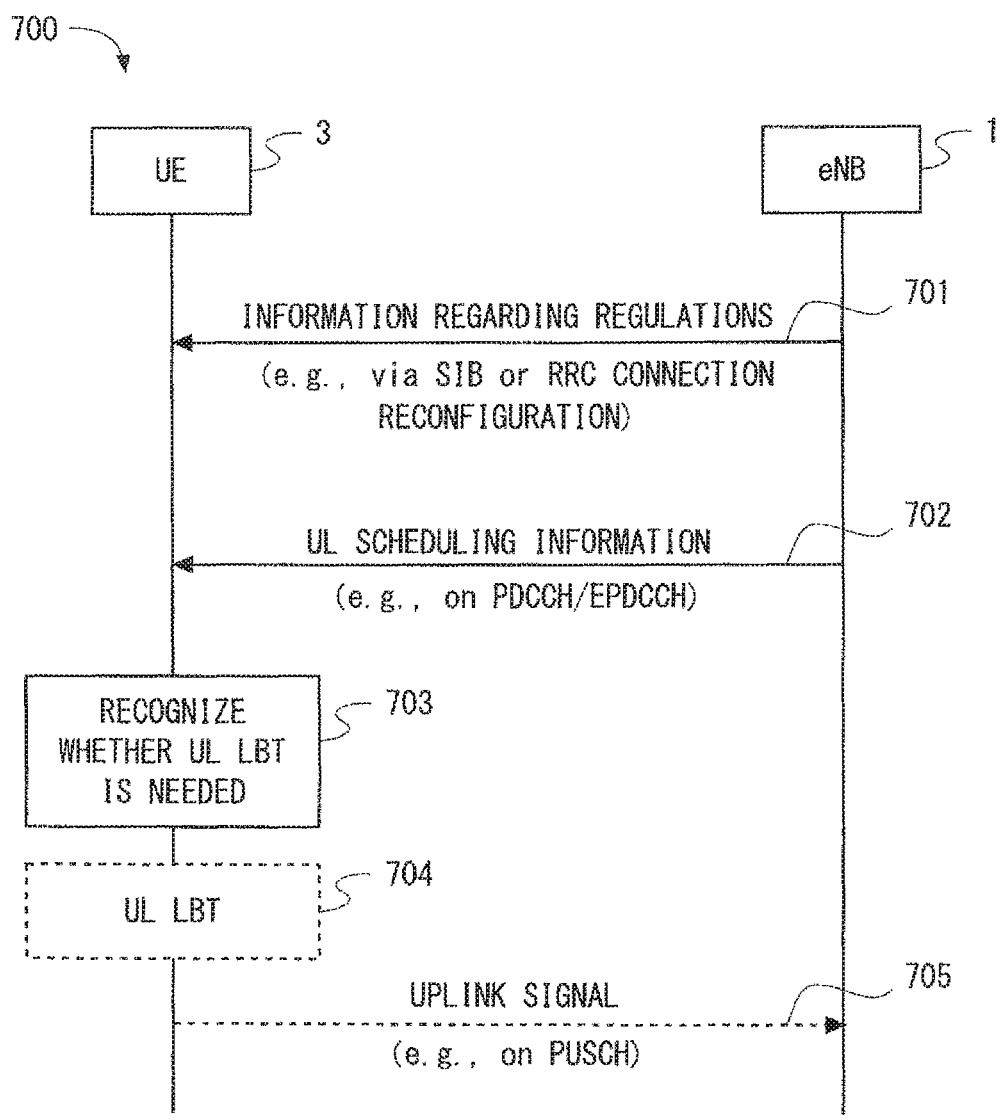
FIG. 7 is a sequence diagram showing one example of operations of a radio base station and a radio terminal according to a third embodiment.

FIG. 7 is a sequence diagram showing one example of operations of the eNB 1 and the UE 3 (Process 700). In Block 701, the eNB 1 transmits to the UE 3, via system information (SIB) or dedicated signaling (RRC Connection Reconfiguration message), the information regarding regulations for radio communication on the unlicensed frequency.

In Block 702, the eNB 1 transmits the UL scheduling information (UL grant) to the UE 3 on a PDCCH/EPDCCH. The eNB 1 may transmit this PDCCH/EPDCCH on (a cell of) the unlicensed frequency or on (a cell of) the licensed frequency.

In Block 703, the UE 3 recognizes (determines), based on the information regarding the regulations received in Block 701 and the UL scheduling information (UL grant) received in Block 702, whether UL LBT needs to be performed by the UE 3. When UL LBT is needed, the UE 3 performs UL LBT (Block 704), performs UL data transmission (PUSCH transmission) on the unlicensed frequency in accordance with the UL grant when the unlicensed frequency channel (resources) for the UL transmission is available (Block 705), but does not perform the UL data transmission when this channel is not available. On the other hand, when the UE 3 has been recognized that UL LBT is not needed, the UE 3 performs UL data transmission (PUSCH transmission) on the unlicensed frequency without performing UL LBT (Block 705). Blocks 704 and 705, which are shown by dashed lines in FIG. 7, indicate that these processing are not performed under certain conditions.

Figure 8A:
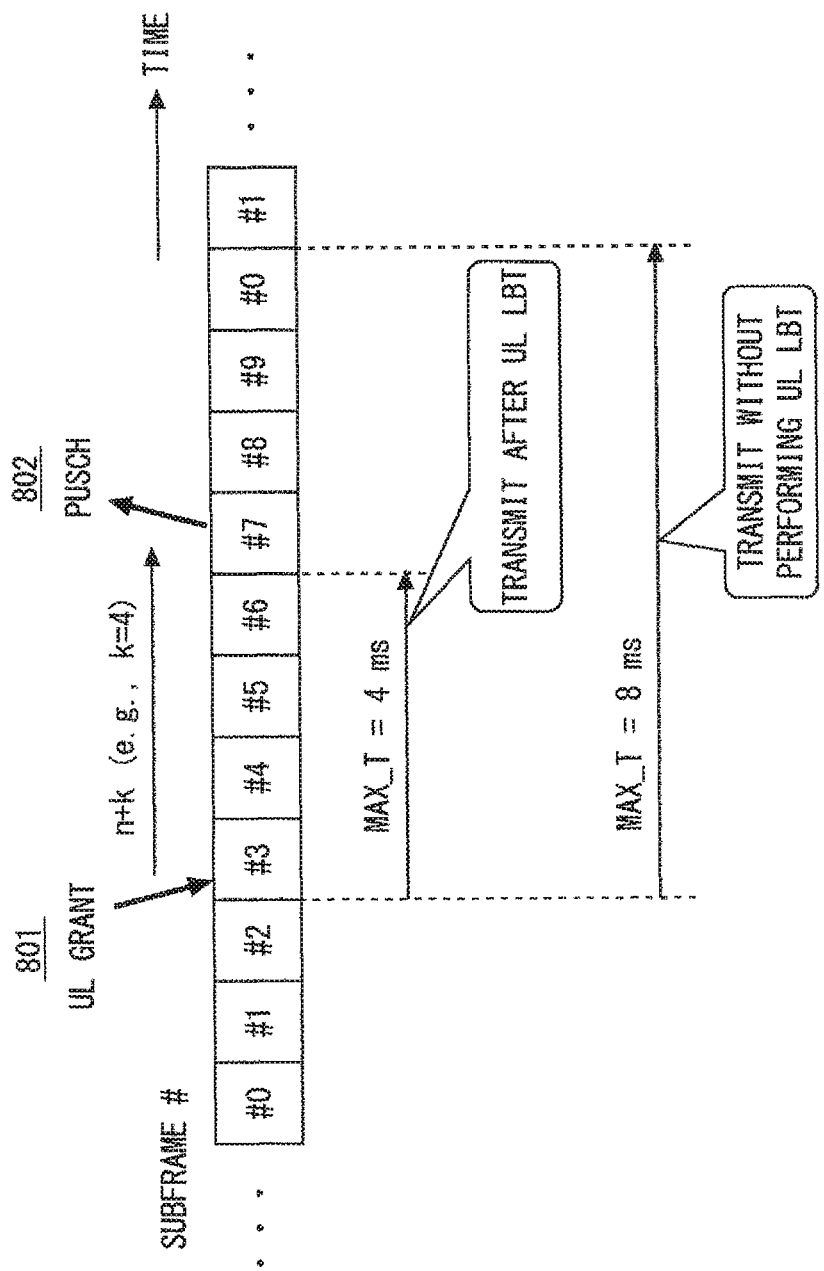
FIG. 8A is a diagram for describing one example of operations performed by the radio terminal according to the third embodiment.

The information regarding regulations transmitted from the eNB 1 to the UE 3 in Block 701 may indicate "the maximum continuous use time (MAX_T) allowed after it has been determined in LBT that the radio resources are available". Assume a case, for example, in which the eNB 1 performs LBT (UL LBT) for the UL transmission radio resources before transmitting the UL grant and immediately (that is, at the top of MAX_T) transmits the UL grant when the UL transmission radio resources are available. In this case, as shown in FIG. 8A, the UE 3 may recognize that UL LBT is not needed when the period from the timing when the UL grant is transmitted by the eNB 1 or the timing when the UL grant is received by the UE 3 (801) to the UL data transmission (PUSCH transmission) corresponding to the UL grant (802) is shorter than the maximum continuous use time (MAX_T) and otherwise may recognize that UL LBT is needed. The maximum continuous use time (MAX_T) may be specified by the number of subframes (i.e., in milliseconds (ms)).

The details thereof will be specifically described with reference to FIG. 8A. The UE 3 performs PUSCH transmission in the subframe n+k (802) in response to receiving the UL grant in the subframe n (801). That is, the value of k defines mapping between the subframe in which the PUSCH transmission is performed and the subframe in which the UL grant is transmitted. While k denotes a positive integer as stated above, it may be the value of k specified in Section 8 of 3GPP TS 36.213 V12.3.0 (Non-Patent Literature 6).

When, for example, the primary cell (in this example, the licensed frequency cell) and the secondary cell (in this example, the unlicensed frequency cell) in CA are both FDD component carriers (CCs) (FDD cells), k is equal to 4 regardless of whether a self-carrier scheduling (self-scheduling) is performed or a cross-carrier scheduling is performed. The self-carrier scheduling is a scheduling method in which a scheduling grant (UL grant and DL grant) is transmitted on the same component carrier as the UE uses for DL data reception or UL data transmission. On the other hand, the cross-carrier scheduling is a scheduling method in which a scheduling grant is transmitted on a different component carrier than that the UE uses for DL data reception or UL data transmission. That is, in the case of the self-carrier scheduling, the UE is configured to monitor, for scheduling of one serving cell, a PDCCH/EPDCCH transmitted in this serving cell. On the other hand, in the case of the cross-carrier scheduling, the UE is configured to monitor, for the scheduling of one serving cell (e.g., SCell), a PDCCH/EPDCCH transmitted in another serving cell (e.g., PCell).

When both the primary cell (licensed frequency cell) and the secondary cell (unlicensed frequency cell) in CA are TDD component carriers (CCs) (TDD cells), the value of k is compliant with the table shown in FIG. 9. The TDD UL/DL configurations shown in the table of FIG. 9 are "UL-reference UL/DL configurations". One of the UL-reference UL/DL configurations is selected according to whether the self-carrier scheduling (self-scheduling) is performed or the cross-carrier scheduling is performed and according to the combination of the UL/DL configurations of the two serving TDD cells.

Further, 3GPP Release 12 and subsequent releases specify CA of an FDD component carrier (FDD CC) and a TDD component carrier (TDD CC). The FDD CC (or the FDD cell) is a cell which uses the frame structure type 1 for FDD. The TDD CC (or the TDD cell) is a cell which uses the frame structure type 2 for TDD. This carrier aggregation is herein referred to as "FDD-TDD aggregation", or simply "FDD-TDD". In FDD-TDD carrier aggregation, the primary cell may either be the FDD CC (FDD cell) or the TDD CC (TDD cell).

In FDD-TDD, when the secondary cell (in this example, the unlicensed frequency cell) is the TDD CC (TDD cell) and the self-carrier scheduling is configured in the UE for PUSCH transmission in the secondary cell, the value of k is compliant with the UL/DL configuration of the secondary cell and the table shown in FIG. 9. When the UL/DL configuration of the TDD secondary cell (in this example, the unlicensed frequency cell) is configuration 0 as one example, according to the definition in the table shown in FIG. 9, the PUSCH transmission corresponding to the UL grant received in subframe #0 is performed in subframe #4 and the PUSCH transmission corresponding to the UL grant received in subframe #1 is performed in subframe #7.

In FDD-TDD, when the secondary cell (in this example, the unlicensed frequency cell) is the TDD CC (TDD cell), the cross-carrier scheduling, which refers to a PDCCH/EPDCCH transmitted in another serving cell, is configured for PUSCH transmission in the secondary cell, and the other serving cell is the FDD cell, the value of k is compliant with the UL/DL configuration of the secondary cell and the table shown in FIG. 9.

Referring back to FIG. 8A, the explanation will be continued. In response to receiving the UL grant (801) in the subframe n, the UE 3 performs the PUSCH transmission (802) in the subframe n+k. When the period from the UL grant (801) to the PUSCH transmission (802) (i.e., k) is smaller than the maximum continuous use time (MAX_T) (in other words, when MAX_T is equal to or larger than k+1), the UE 3 does not need to execute UL LBT. On the other hand, when the period from the UL grant (801) to the PUSCH transmission (802) (i.e., k) is equal to or larger than the maximum continuous use time (MAX_T) (in other words, when MAX_T is equal to or smaller than k), the UE 3 executes UL LBT. As shown in FIG. 8A, for example, when MAX_T is equal to 4 ms and k is equal to 4, the UE 3 performs PUSCH transmission after performing UL LBT. On the other hand, when MAX_T is equal to 8 ms and k is equal to 4, the UE 3 performs PUSCH transmission without performing UL LBT.

The series of operations of the UE 3 related to the example shown in FIGS. 7 and 8A can be summarized as follows. If the UE 3 received the predetermined signal (e.g., the UL grant (801)) in the subframe n and time has not yet elapsed (after the reception) more than the first period (e.g., MAX_T), the UL signal (e.g., PUSCH (802) in accordance with the UL grant (801)) can be transmitted without executing LBT.

In other words, if the UE 3 received the predetermined signal (i.e., UL grant (801)) in the subframe n and the first period (e.g., MAX_T) is smaller than k+1, the UE 3 needs to perform LBT before transmitting the UL signal (e.g., PUSCH (802) in accordance with the UL grant (801)).

Figure 8B:
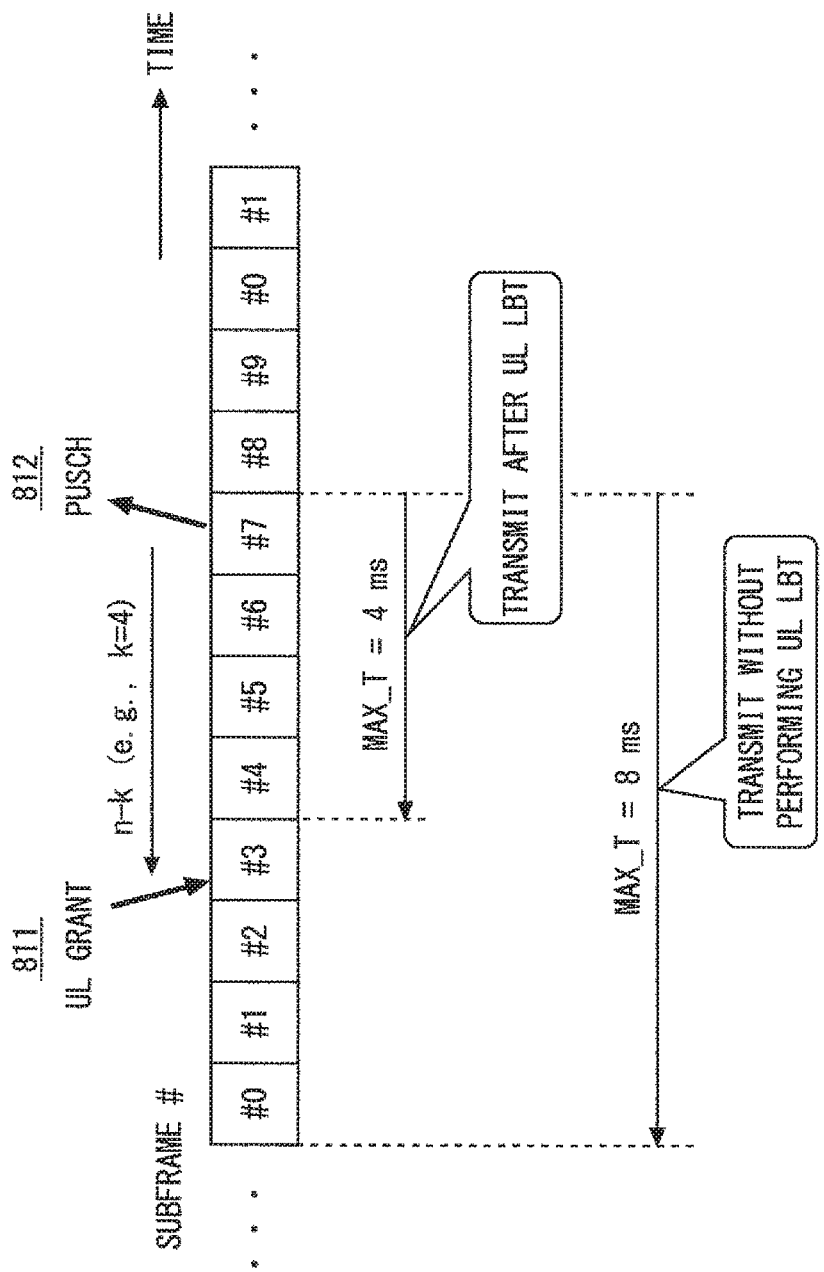
FIG. 8B is a diagram for describing one example of the operations performed by the radio terminal according to the third embodiment.

In place of the example shown in FIG. 8A, the UE 3 may operate according to the example shown in FIG. 8B. That is, when the period from the timing (subframe) of the UL transmission (812) back to the transmission of the predetermined signal by the eNB 1 or the reception of the predetermined signal by the UE 3 (e.g., the UL grant (811)) is shorter than the first period (i.e., the continuous use time allowed after the predetermined signal is received, MAX_T), the UE 3 may recognize that UL LBT is not needed. That is, when the UE 3 received the predetermined signal (e.g., the UL grant (811)) within a period shorter than the first period from the timing of the UL transmission (812), the UE 3 may recognize that UL LBT is not needed.

In the example shown in FIG. 8B, the UE 3 performs PUSCH transmission (812) in the subframe n. When the period (i.e., k) from the PUSCH transmission (812) back to the subframe n−k (811) in which the transmission or the reception of the UL grant (801) has been performed is smaller than the maximum continuous use time (MAX_T) (in other words, when MAX_T is equal to or larger than k+1), the UE 3 does not need to execute UL LBT. On the other hand, when the period (i.e., k) from the PUSCH transmission (812) back to the transmission or the reception of the UL grant (801) is equal to or larger than the maximum continuous use time (MAX_T) (in other words, when MAX_T is equal to or smaller than k), the UE 3 executes UL LBT. As shown in FIG. 8B, for example, when MAX_T is equal to 4 ms and k is equal to 4, the UE 3 performs PUSCH transmission after performing UL LBT. On the other hand, when MAX_T is equal to 8 ms and k is equal to 4, the UE 3 performs PUSCH transmission without performing UL LBT.

The series of operations of the UE 3 related to the examples shown in FIGS. 7 and 8B can be summarized as follows. If the UE 3 received the predetermined signal (e.g., the UL grant (811)) within a period shorter than the first period (e.g., MAX_T) from the current subframe n, the UL signal (e.g., PUSCH (812) in accordance with the UL grant (811)) can be transmitted without executing LBT.

In other words, if the UE 3 received the predetermined signal (e.g., the UL grant (811)) in the subframe n−k and the first period (e.g., MAX_T) is smaller than k+1, the UE 3 needs to perform LBT before transmitting the UL signal (e.g., PUSCH (812) in accordance with the UL grant (811)) in the current subframe n.

The UL transmission timing (k or a value equivalent to k) on the unlicensed frequency may be newly defined in the 3GPP specifications, apart from the value of k defined in Non-Patent Literature 6. Alternatively, the eNB 1 may specify information that defines the UL transmission timing on the unlicensed frequency (k or a value equivalent to k) to the UE 3.

Figure 8C:
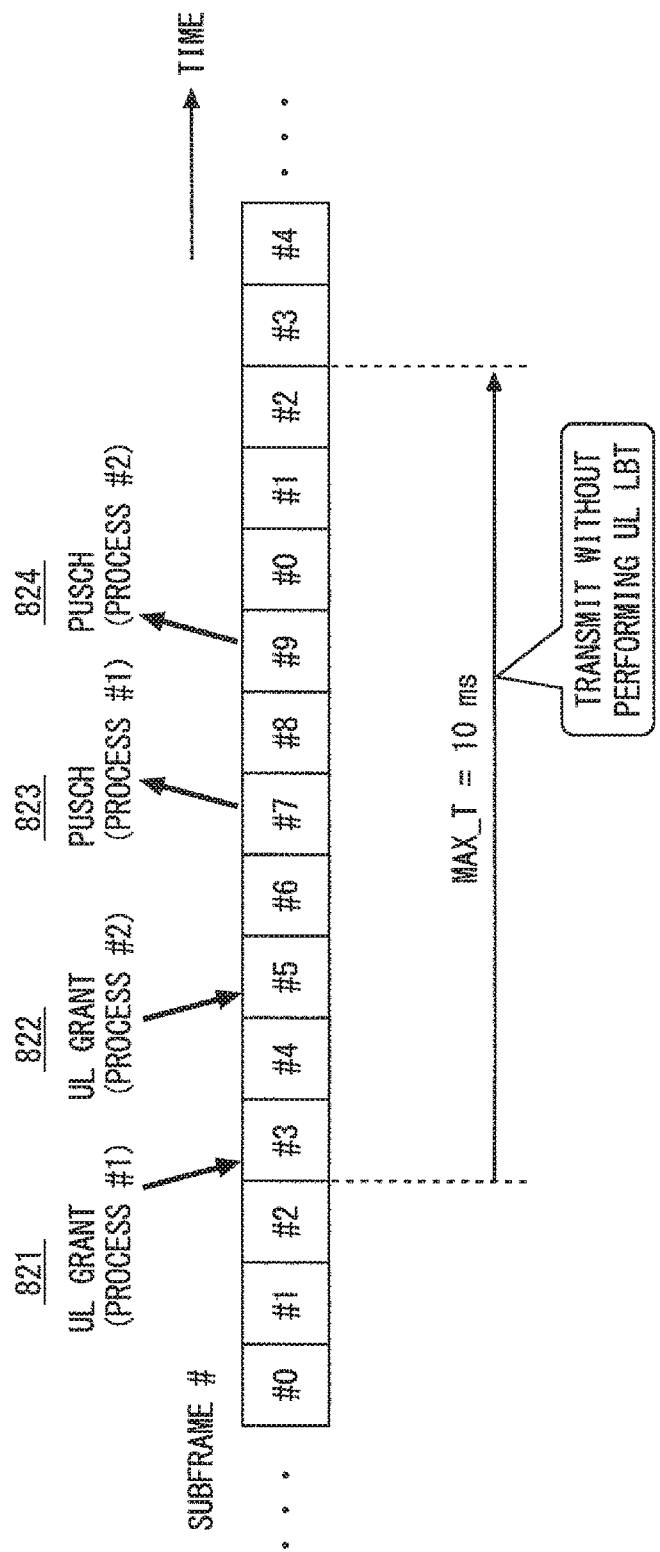
FIG. 8C is a diagram for describing one example of the operations performed by the radio terminal according to the third embodiment.

In the example described with reference to FIG. 8A, after transmitting the UL grant (801), the eNB 1 may notify the UE 3 that LBT does not needs to be performed for other UL grants that fall within MAX_T counted from the timing of the transmission of the UL grant (801). Alternatively, in the example described with reference to FIG. 8A, the UE 3 may operate to omit LBT for other UL grants that fall within MAX_T counted from the timing of the reception of the UL grant (801). The same is applicable to the example described with reference to FIG. 8B. Specifically, as shown in FIG. 8C, within MAX_T (in this example, 10 ms) counted from the timing of the reception of the UL grant (821) associated with process #1 (e.g., HARQ process #1), the UE 3 may transmit not only a PUSCH (823) in accordance with the UL grant (821) associated with process #1 but also a PUSCH (824) in accordance with the UL grant (822) associated with another process #2 (e.g., HARQ process #2) without performing UL LBT.

Figure 8D:
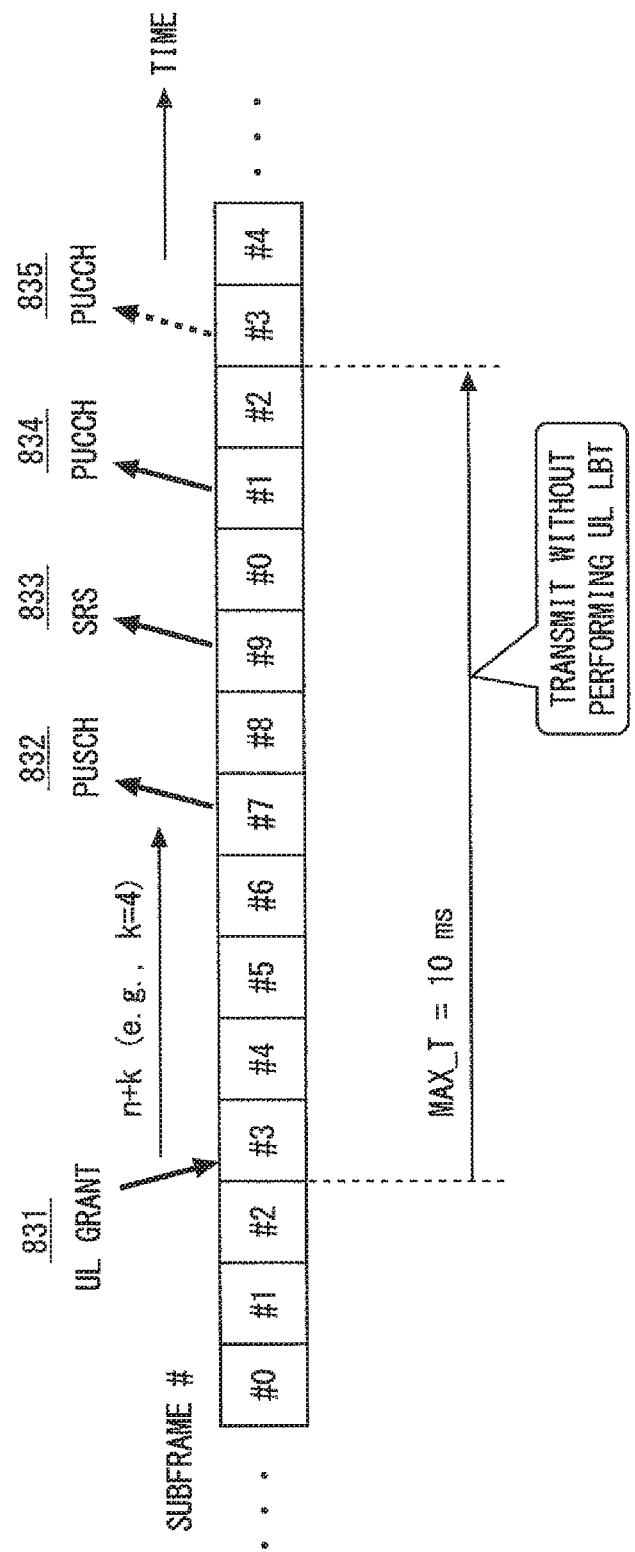
FIG. 8D is a diagram for describing one example of the operations performed by the radio terminal according to the third embodiment.

Further, in the example described with reference to FIG. 8A, the UE 3 may operate to omit LBT for arbitrary UL transmission that falls within MAX_T counted from the timing of the reception of the UL grant (801). The same is applicable to the example described with reference to FIG. 8B. For example, as shown in FIG. 8D, the arbitrary UL transmission includes an SRS and a PUCCH. In the example shown in FIG. 8D, within MAX_T (in this example, 10 ms) counted from the timing of the reception of the UL grant (831), the UE 3 performs not only PUSCH transmission (832) in accordance with UL grant (831) but also SRS transmission (833) and PUCCH transmission (834) without performing LBT. PUCCH transmission (835), which is outside MAX_T, may be performed after LBT or may be suspended.

Figure 8E:
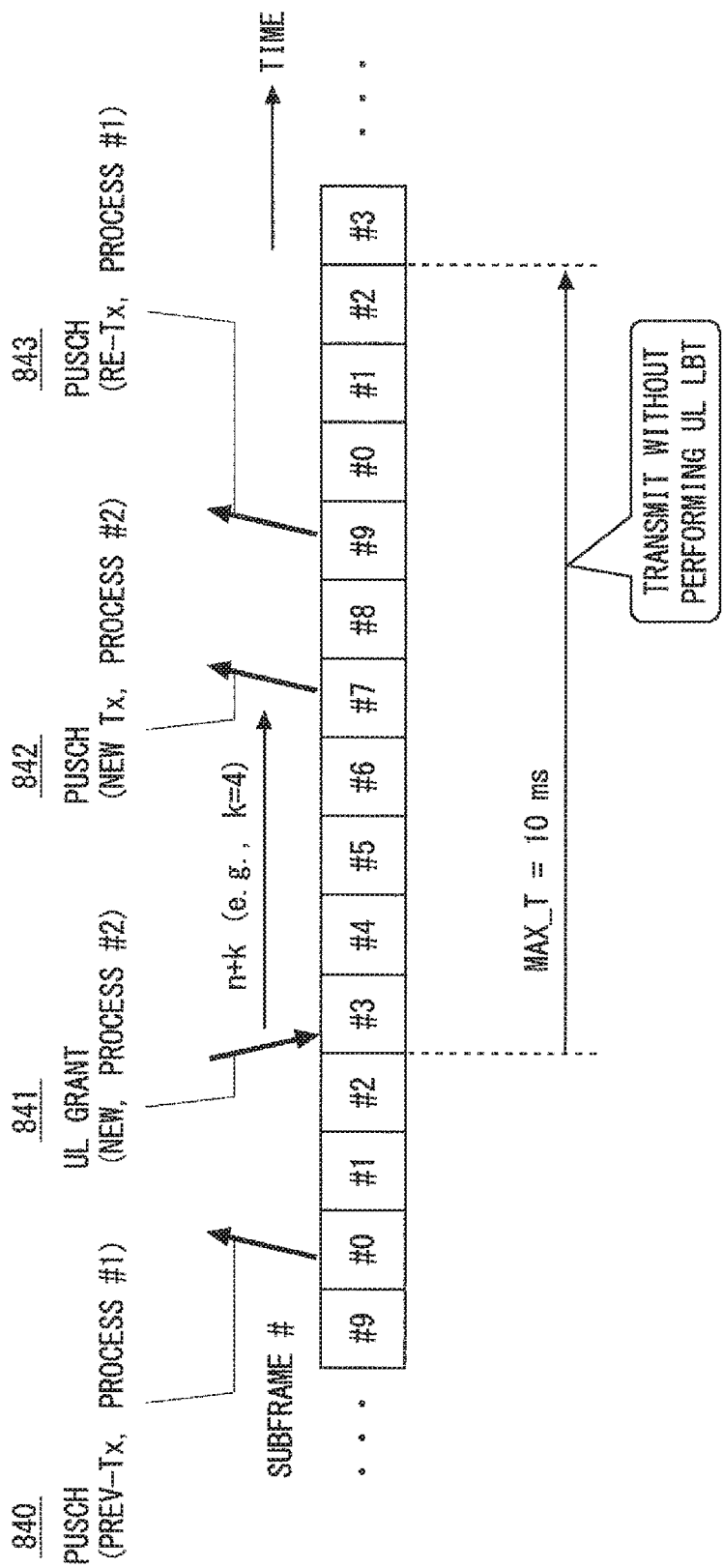
FIG. 8E is a diagram for describing one example of the operations performed by the radio terminal according to the third embodiment.

Further, for example, as shown in FIG. 8E, the arbitrary UL transmission includes PUSCH retransmission based on uplink HARQ. In the example shown in FIG. 8E, when not only PUSCH transmission (842) in accordance with UL grant (841) but also PUSCH retransmission (843) in another process (e.g., HARQ process) fall within MAX_T (in this example, 10 ms) counted from the timing of the reception of the UL grant (841), the UE 3 may omit LBT before this retransmission (843). The PUSCH retransmission (843) is transmission in process #1 (e.g., HARQ process #1) and is performed in response to the previous PUSCH transmission (840) having been failed.

The examples shown in FIGS. 8A-8E provide descriptions of the case in which the information regarding the regulations transmitted from the eNB 1 to the UE 3 indicates "the maximum continuous use time (MAX_T) allowed after it has been determined in LBT that the radio resources are available". Further, these examples assume the case in which the eNB 1 performs LBT (UL LBT) for the UL transmission radio resources before the transmission of the UL grant and transmits the UL grant immediately (i.e., at the top of MAX_T) when the UL transmission radio resources are available. Alternatively, as shown in FIG. 8F, the UE 3 itself may perform LBT (UL LBT) and, if it confirms that the UL transmission radio resources are available, may perform UL transmission without performing new LBT during the maximum continuous use time (MAX_T).

Figure 8F:
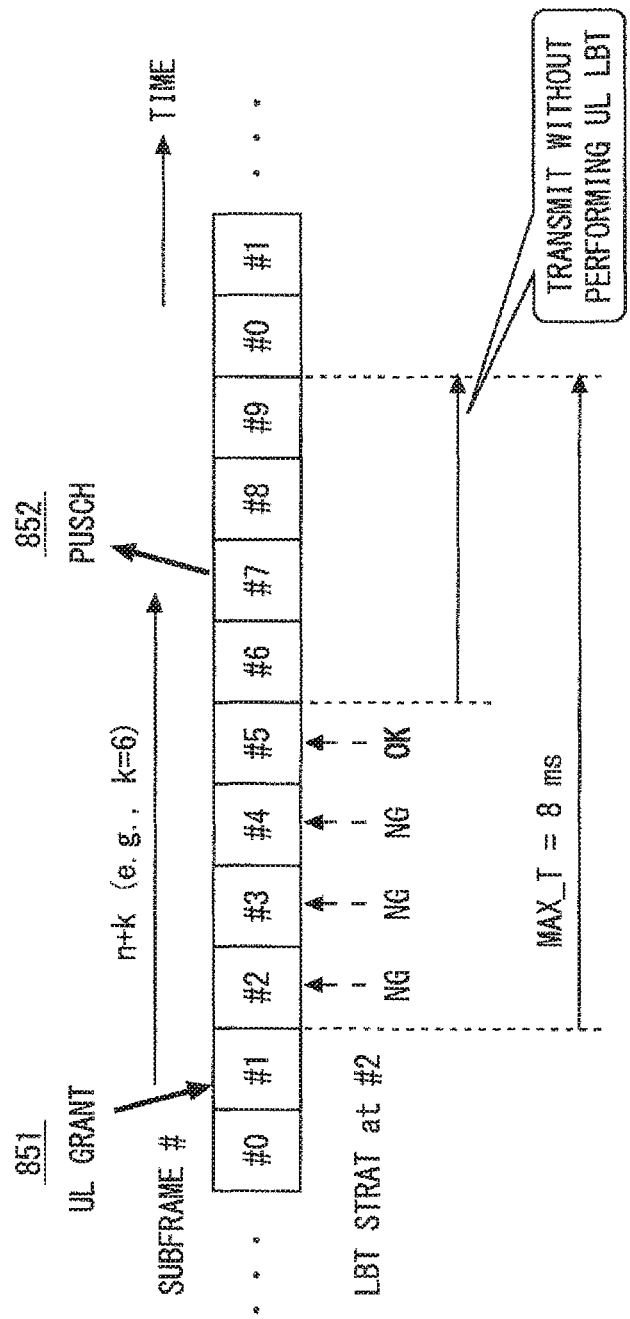
FIG. 8F is a diagram for describing one example of the operations performed by the radio terminal according to the third embodiment.

In the example shown in FIG. 8F, in response to receiving UL grant (851) in subframe #1, the UE 3 starts LBT from subframe #2 and determines, in subframe #5, that the unlicensed frequency resources are available. In this case, the UE 3 is allowed to perform PUSCH transmission including PUSCH transmission (852) without performing LBT from the time when it is determined that unlicensed frequency resources are available until the time when the maximum continuous use time (MAX_T) defined based on the reception of the UL grant (851) expires (i.e., from subframe #6 to subframe #9). Similar to the description provided with reference to FIG. 8D, the UE 3 may perform arbitrary UL transmission, other than PUSCH, without performing LBT from the time when it is determined that the unlicensed frequency resources are available until the time when the maximum continuous use time (MAX_T) expires.

Figure 10:
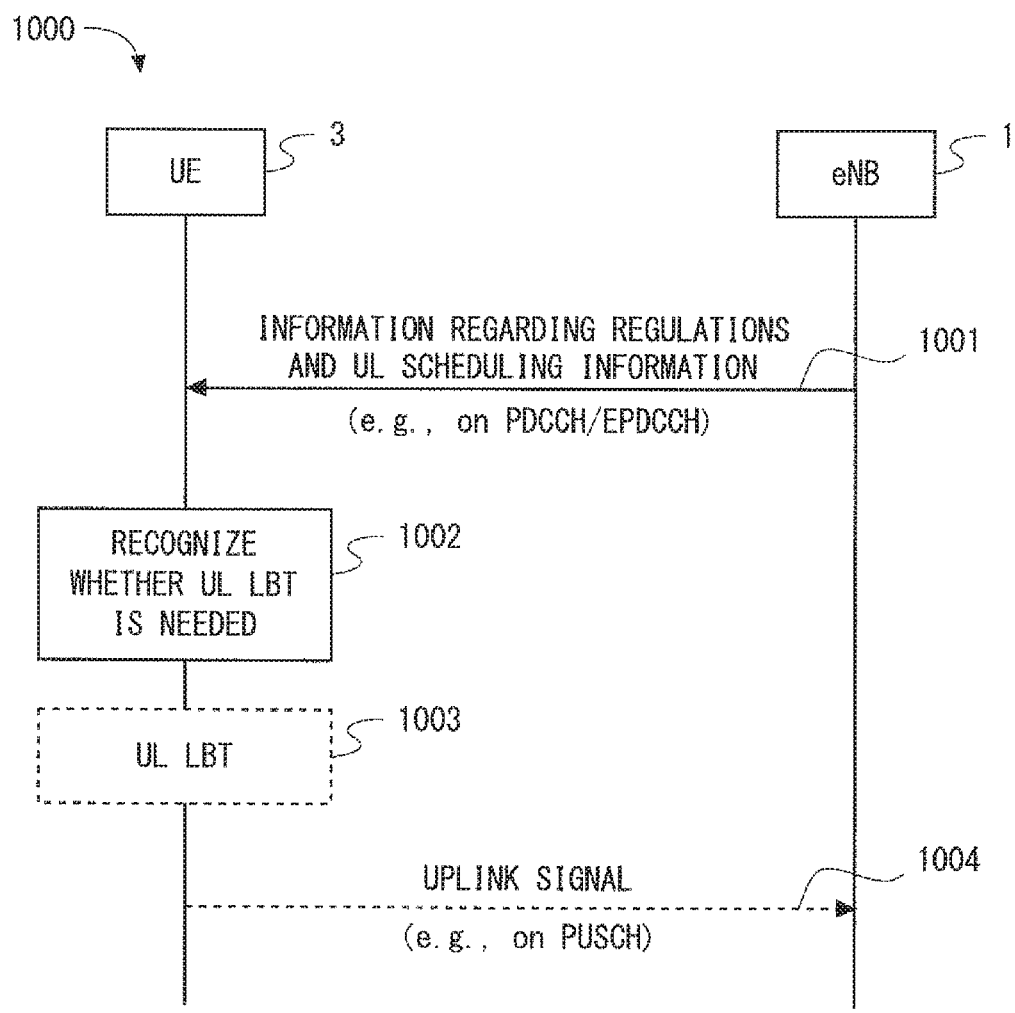
FIG. 10 is a sequence diagram showing one example of operations of the radio base station and the radio terminal according to the third embodiment.

FIG. 10 is a sequence diagram showing one example of operations of the eNB 1 and the UE 3 (Process 1000). In Block 1001, the eNB 1 transmits to the UE 3, on a PDCCH/EPDCCH, the information regarding the regulations together with the uplink scheduling information (UL grant). The eNB 1 may first transmit the information regarding the regulations on a PDCCH/EPDCCH different from the PDCCH/EPDCCH on which the UL grant is transmitted. In this case, the eNB 1 may transmit these PDCCHs/EPDCCHs in cells different from each other. The eNB 1 may transmit one or more PDCCHs/EPDCCHs in the cell on the unlicensed frequency or in the cell on the licensed frequency (e.g., PCell).

In Block 1002, the UE 3 recognizes (determines), based on the information regarding regulations received in Block 1001 and the UL scheduling information (UL grant), whether UL LBT needs to be performed by the UE 3. When UL LBT is needed, the UE 3 performs UL LBT (Block 1003), then performs UL data transmission (PUSCH transmission) on the unlicensed frequency in accordance with the UL grant when the unlicensed frequency channel (resources) for the UL transmission is available (Block 1004), but does not perform the UL data transmission when this channel is not available. On the other hand, when the UE 3 has been recognized that UL LBT is not needed, the UE 3 performs UL data transmission (PUSCH transmission) on the unlicensed frequency without performing UL LBT (Block 1004). Blocks 1003 and 1004, which are shown by dashed lines in FIG. 10, indicate that these processing are not performed under certain conditions.

Figure 11:
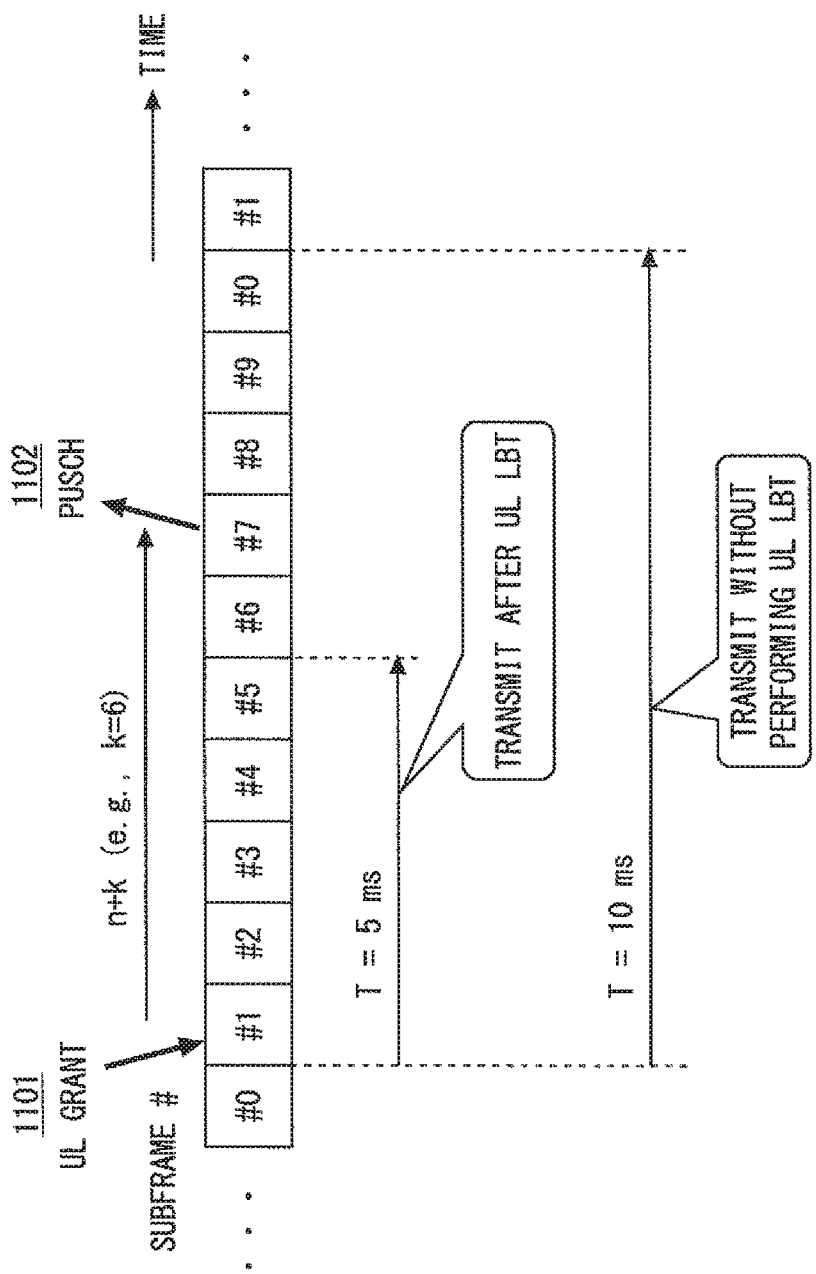
FIG. 11 is a diagram for describing one example of the operations performed by the radio terminal according to the third embodiment.

The information regarding the regulations transmitted from the eNB 1 to the UE 3 in Block 1001 may indicate "the continuous use time (T) allowed after the predetermined signal is received". Assume a case, for example, in which the eNB 1 performs LBT (UL LBT) for the UL transmission radio resources before transmitting the UL grant and transmits the UL grant together with the continuous use time (T) when the UL transmission radio resources are available. The eNB 1 may calculate the continuous use time (T) based on the difference between the time when UL LBT was executed and the time when the UL grant will be transmitted. In this case, as shown in FIG. 11, the UE 3 may recognize that UL LBT is not needed when the period from the timing of the transmission of the UL grant by the eNB 1 or the timing of the reception of the UL grant by the UE 3 (1101) to the timing of the UL data transmission (PUSCH transmission) (1102) corresponding to the UL grant is shorter than the continuous use time (T), and otherwise may recognize that UL LBT is needed. The maximum continuous use time (MAX_T) may be specified by the number of subframes (i.e., in milliseconds (ms)).

The details thereof will be specifically described with reference to FIG. 11. In response receiving the UL grant (1101) in the subframe n, the UE 3 performs PUSCH transmission (1102) in the subframe n+k. The period from the UL grant (1101) to the PUSCH transmission (1102) (i.e., k) is smaller than the continuous use time (T) (in other words, when T is equal to or larger than k+1), the UE 3 does not need to execute UL LBT. On the other hand, when the period from the UL grant (1101) to the PUSCH transmission (1102) (i.e., k) is equal to or larger than the continuous use time (T) (in other words, when T is equal to or smaller than k), the UE 3 executes UL LBT. As shown in FIG. 11, for example, when T is equal to 5 ms and k is equal to 6, the UE 3 performs PUSCH transmission after performing UL LBT. On the other hand, when T is equal to 10 ms and k is equal to 6, the UE 3 performs PUSCH transmission without performing UL LBT.

In the specific examples described with reference to FIGS. 7 to 11, the explanation has been given regarding the UL data transmission. These specific examples may be performed for UL signal transmission other than the UL data transmission. For example, the UL scheduling information transmitted in Block 702 in FIG. 7 and Block 1001 in FIG. may be replaced by a RACH preamble transmission request (PDCCH order) transmitted by the eNB 1 and the uplink signal (PUSCH) transmitted in Block 705 in FIG. 7 and Block 1004 in FIG. 10 may be replaced by a PRACH. Alternatively, the UE 3 may always omit LBT without recognizing the necessity of UL LBT with regard to transmission of the UL control signals (e.g., SRS, PRACH, or PUCCH), and transmit these control signals on the radio resources assigned by the eNB 1.

In the above description of the specific examples described with reference to FIGS. 7 to 11, the maximum continuous use time (MaX_T) or the continuous use time (T) is used as the information regarding regulations for radio communication on the unlicensed frequency. However, the information regarding the regulations may include the LBT determination information. In this case, in response to receiving the LBT determination information, the UE 3 may recognize that UL LBT is needed. Then the UE 3 may execute LBT based on the matters indicated in the LBT determination information.

Further, the information regarding the regulations may include the duty cycle information. In this case, in response to receiving the duty cycle information, the UE 3 may recognize that UL LBT is needed. Then the UE 3 may execute LBT based on the matters indicated in the Duty cycle information.

Figure 12:
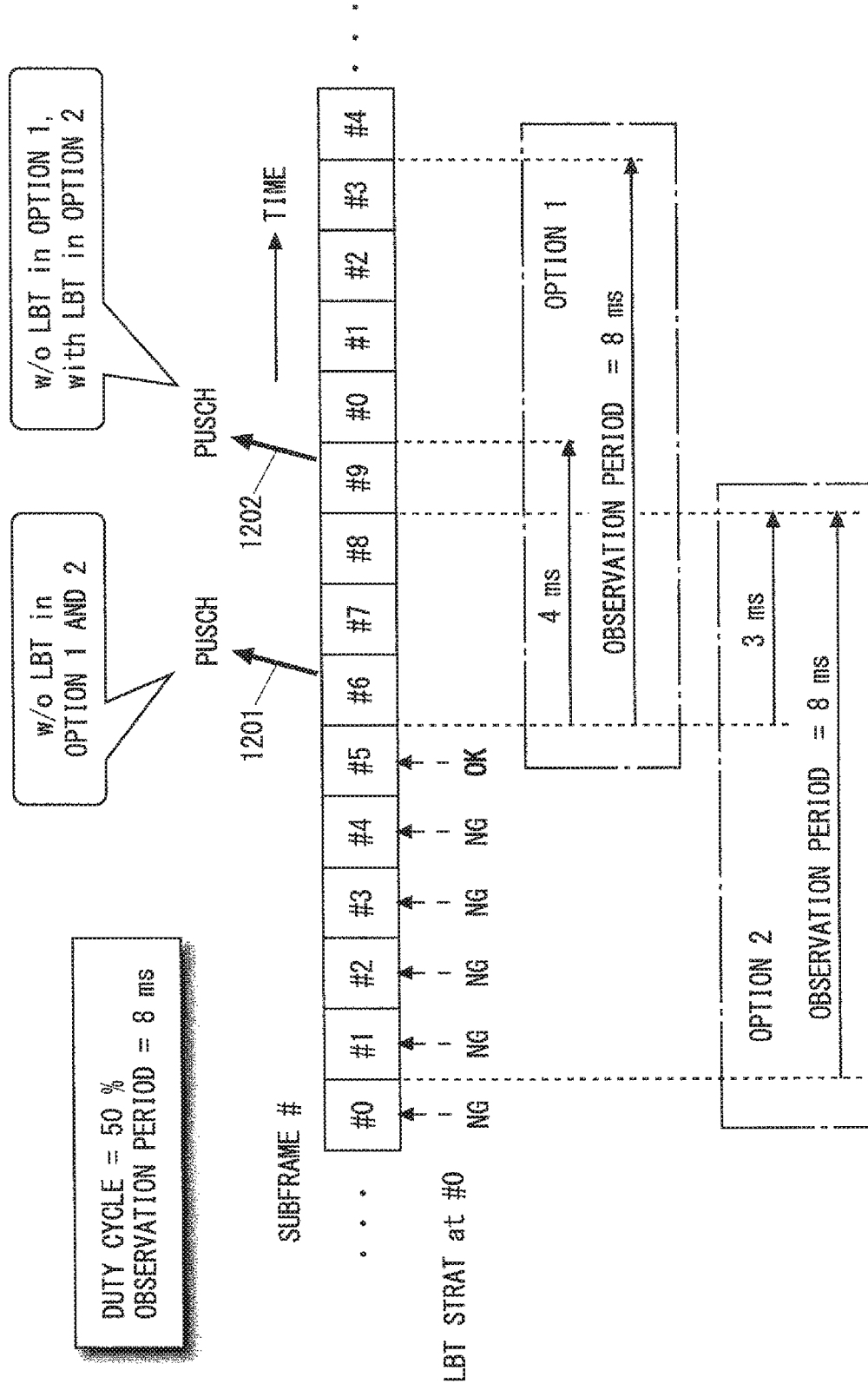
FIG. 12 is a diagram for describing one example of the operations performed by the radio terminal according to the third embodiment.

FIG. 12 shows one example of operations of the UE 3 based on the duty cycle information. In the example shown in FIG. 12, the duty cycle information includes a duty cycle (XX %) and an observation period (yy ms). In Option 1 shown in FIG. 12, the UE 3 may perform UL transmission without performing new LBT for a period of yy*XX/100 ms after the UE 3 has determined that the radio resources are available as a result of UL LBT performed by the UE 3 itself. In Option 2 shown in FIG. 12, when the UE 3 has determined that the radio resources are available as a result of UL LBT performed by the UE 3 itself, the UE 3 may perform UL transmission without performing new LBT for a period of yy ms after the UE 3 has started LBT or a period of yy*XX/100 ms after the UE 3 has determined that the radio resources are available, whichever expires first.

FIG. 12 shows a case in which the duty cycle and the observation period are respectively 50% and 8 ms. In the example shown in FIG. 12, the UE 3 starts LBT in subframe #0 and determines, in subframe #5, that the unlicensed frequency resources are available. In this case, in Option 1 in FIG. 12, the UE 3 is allowed to perform UL transmission without performing LBT for a period of four subframes (4 ms) from subframe #6 to subframe #9. On the other hand, in Option 2 in FIG. 12, the UE 3 is allowed to perform UL transmission without performing LBT for a period of three subframes (3 ms) from subframe #6 to subframe #8. Accordingly. PUSCH transmission (1201) in subframe #6 is performed without performing LBT in both Options 1 and 2. On the other hand, regarding PUSCH transmission (1202) in subframe #9, LBT is not needed when Option 1 is selected, whereas additional LBT is required when Option 2 is selected. Note that LBT may be started in subframe #0 and subframe #0 may be included in the observation period.

Fourth Embodiment

This embodiment provides a specific example of the processing performed by the UE and the eNB. Configuration examples of a radio communication system according to this embodiment are the same as those shown in FIGS. 1A, 1B, and 2 described with regard to the first embodiment. In this embodiment, the UE 3 operates to; recognize, based on the control information received from the eNB 1, whether UL LBT needs to be performed by the UE 3: perform UL transmission on the unlicensed frequency after UL LBT when UL LBT is needed; and perform UL transmission on the unlicensed frequency without performing UL LBT when UL LBT is not needed.

The UE 3 receives first control information via system information (SIB) or dedicated signaling (RRC Connection Reconfiguration message). Furthermore, the UE 3 receives second control information together with uplink scheduling information (UL grant). The first control information is used by the UE 3 to recognize (determine) whether UL LBT is needed per configuration of a cell or component carrier that uses the unlicensed frequency. The second control information is used by the UE 3 to recognize (determine) whether UL LBT is needed on a per UL transmission basis. The first and second control information may each include the "information regarding necessity for UL LBT", or the "information regarding the regulatory requirements for the radio communication on the unlicensed frequency", or both. The unit of UL transmission may be defined as, for example, transmissions in accordance with an uplink scheduling grant (UL grant), i.e., transmissions by a HARQ process, or may be a combination of a new transmission (HARQ initial transmission) and a synchronous non-adaptive retransmission. In the latter case, the second control information may be transmitted to the UE 3 again when the eNB 1 instructs HARQ retransmission on a PDCCH/EPDCCH.

The UE 3 recognizes, based on the first control information, whether UL LBT is needed in the cell or component carrier that uses the unlicensed frequency. When the UE 3 has recognized that UL LBT is not needed based on the first control information, the UE 3 is able to omit the determination regarding whether UL LBT is needed on a per UL transmission basis. Accordingly, it is possible to reduce load due to the frequent determination of the necessity of UL LBT. On the other hand, when the UE 3 has recognized that UL LBT is needed based on the first control information, the UE 3 further recognizes, based on the second control information, whether UL LBT is needed on a per UL transmission basis. Accordingly, the UE 3 is able to perform fine determination on a per UL transmission basis, whereby it is possible to suppress execution of unnecessary UL LBT more efficiently. Further, using such an operation, the eNB 1 is able to easily cause some UEs 3 to perform UL LBT while allowing other UEs 3 to omit UL LBT. Specifically, the eNB 1 may notify UEs 3 to be allowed to omit UL LBT that UL LBT is not needed in the first control information.

Figure 13:
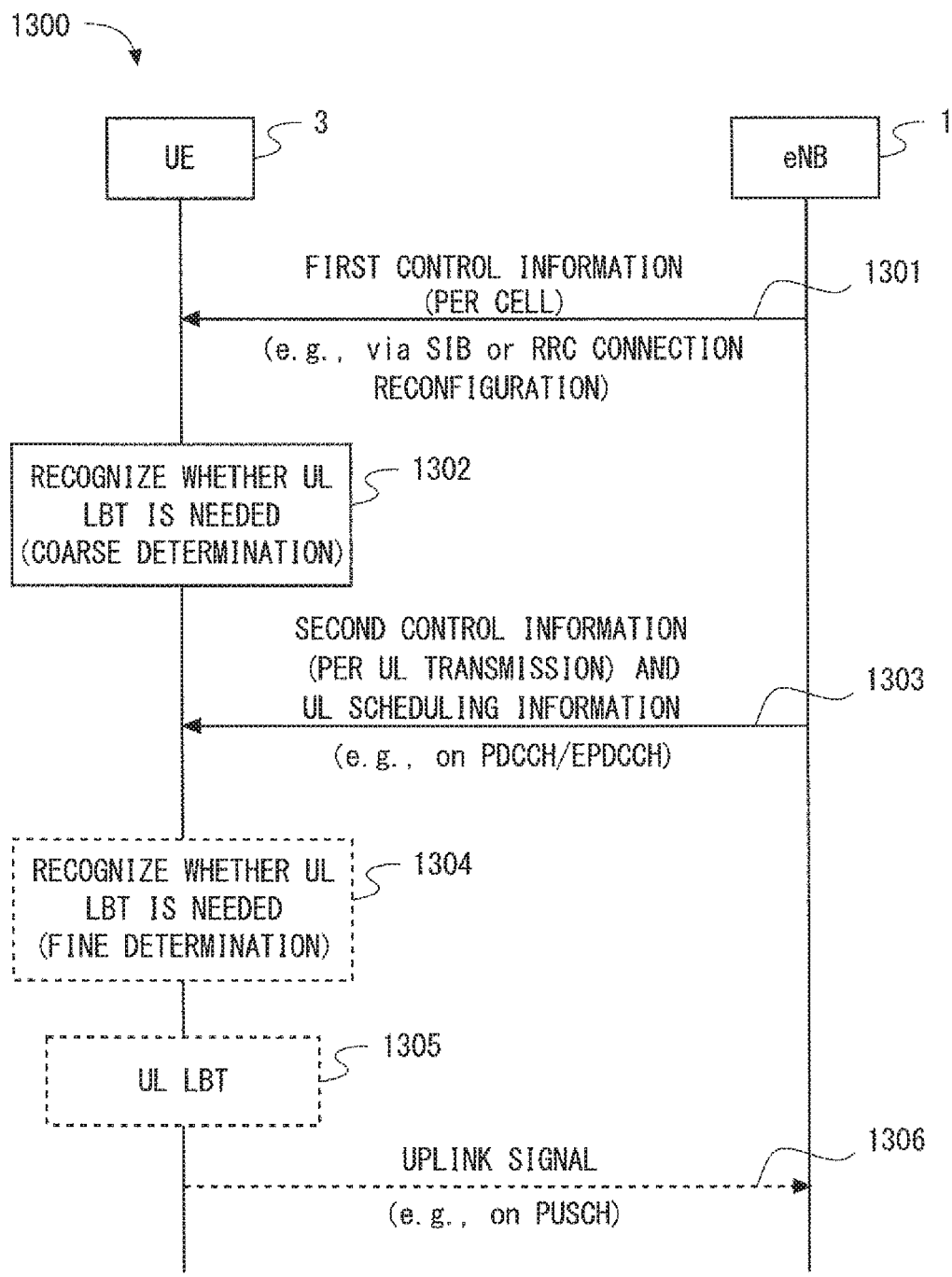
FIG. 13 is a sequence diagram showing one example of operations of a radio base station and a radio terminal according to a fourth embodiment.

FIG. 13 is a sequence diagram showing one example of operations of the eNB 1 and the UE 3 (Process 1300). In Block 1301, the eNB 1 transmits the first control information (e.g., Flag or Boolean) via system information (SIB) or dedicated signaling (RRC Connection Reconfiguration message). In Block 1302, the UE 3 recognizes (determines), based on the first control information received from the eNB 1, whether UL LBT needs to be performed by the UE 3. Since the recognition (determination) in Block 1302 is performed on a per cell (or component carrier) configuration basis, it can be called a coarse determination (recognition).

In Block 1303, the eNB 1 transmits the second control information to the UE 3 on a PDCCH/EPDCCH together with uplink scheduling information (UL grant). When the UE 3 has determined in Block 1302 that UL LBT is needed, the UE 3 recognizes, based on the second control information, whether UL LBT is needed on a per UL transmission (PUSCH transmission) basis (Block 1304). Since the determination in Block 1304 is performed on a per UL transmission basis, it can be called a fine determination (recognition).

When the UE 3 has recognized in Block 1304 that UL LBT is needed, the UE 3 performs UL LBT (Block 1305), and then performs UL data transmission (PUSCH transmission) on the unlicensed frequency in accordance with the UL grant when the unlicensed frequency channel (resources) for the UL transmission is available (Block 1306), but does not perform the UL data transmission when the channel is not available. On the other hand, when the UE 3 has recognized in Block 1304 that UL LBT is not needed, the UE 3 performs UL data transmission (PUSCH transmission) on the unlicensed frequency without performing UL LBT (Block 1306). When the UE has recognized in the coarse determination in Block 1302 that UL LBT is not needed, the UE 3 skips Blocks 1304 and 1305 and performs UL data transmission (PUSCH transmission) without performing UL LBT (Block 1306). Blocks 1304, 1305, and 1306, which are shown by dashed lines in FIG. 13, indicate that these processing are not performed under certain conditions.

Fifth Embodiment

Figure 14:
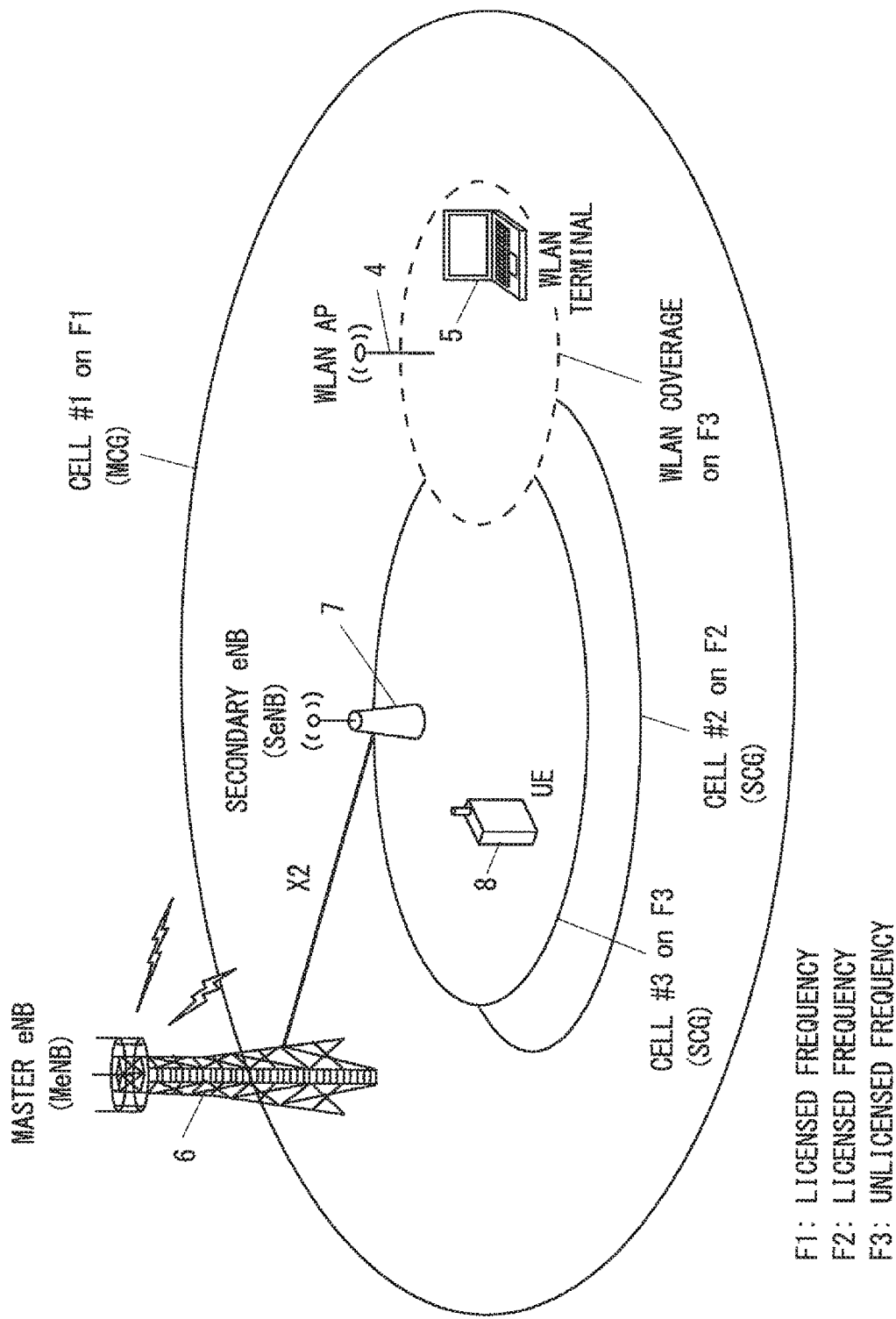
FIG. 14 is a diagram showing a configuration example of a radio communication system and another radio system according to several embodiments.

The aforementioned first to fourth embodiments provide the examples of LTE-U by the LAA scheme in which CA is performed on the licensed frequency and the unlicensed frequency. This embodiment provides an application of the techniques described in the first to fourth embodiments to Dual Connectivity (DC). FIG. 14 is a diagram showing a configuration example of a radio communication system according to this embodiment. Radio base stations (eNBs) 6 and 7 and a radio terminal (UE) 8 have the Dual Connectivity function. Dual Connectivity is processing in which the UE 8 performs communication simultaneously using radio resources (i.e., cells or carriers) provided (i.e., managed) by a main base station (master base station, Master eNB (MeNB)) 6 and a sub base station (secondary base station, Secondary eNB (SeNB)) 7. In the example shown in FIG. 14, the MeNB 6 and the SeNB 7 are connected to each other via an X2 interface, the MeNB 6 manages Cell #1 on the licensed frequency F1, and the SeNB 7 manages both Cell #2 on the licensed frequency F2 and Cell #3 on the unlicensed frequency F3. The MeNB 6 and the SeNB 7 operate as normal LTE eNBs for UEs that do not perform DC and are able to independently communicate with these UEs in the Cell #1 and the Cell #2, respectively.

The UE 8 supporting DC is able to perform carrier aggregation (CA) simultaneously using multiple cells that are managed by the MeNB 6 and the SeNB 7 and on different frequencies. The group of serving cells managed by the MeNB 6 is referred to as a Master Cell Group (MCG) and the group of serving cells managed by the SeNB 7 is referred to as a Secondary Cell Group (SCG). The MCG includes at least a Primary Cell (PCell) and may further include one or more Secondary Cells (SCells). The SCG includes at least a Primary SCell (abbreviated as a pSCell or a PSCell) and may further include one or more SCells. The pSCell is a cell to which at least the physical uplink control channel (PUCCH) is allocated and serves as the PCell in the SCG.

The following briefly describes the Dual Connectivity (DC). See, for example, Non-Patent Literature 7 for the details of Dual Connectivity. The MeNB 6 maintains a connection (S1-MME) with a mobility management apparatus (MME) in a core network (Evolved Packet Core (EPC)) for the UE 8 executing DC. Accordingly, the MeNB 6 may be referred to as a mobility management point (or a mobility anchor) for the UE 8. Therefore, control information of the Control Plane (CP) is transmitted between the MeNB 6 and the UE 8 in the MCG. Control information of the CP regarding the SCG of the SeNB 7 is transmitted between the SeNB 7 and the MeNB 6 (X2 interface) and is further transmitted between the MeNB 6 and the UE 8 in the MCG. For example, Radio Resource Configuration of the SCG (e.g., RadioResourceConfigDedicated IE) is transmitted from the SeNB 7 to the MeNB 6 by an inter-node RRC message (SeNB to MeNB container) referred to as "SCG-Config" and is transmitted from the MeNB 6 to the UE 8 by an RRC Connection Reconfiguration message (SCG configuration IE). On the other hand, terminal capability information (UE-EUTRA capabilities IE) of the UE 8, security information (e.g., S-KeNB) about the SCG, Radio Resource Configuration (e.g., RadioResourceConfigDedicated IE) of the MCG and the like are transmitted from the MeNB 6 to the SeNB 7 by an inter-node RRC message (MeNB to SeNB container) referred to as "SCG-ConfigInfo".

In DC, from the viewpoint of the bearer configuration on the User Plane (UP), three different configurations are supported. The first configuration is an MCG bearer. The MCG bearer is a bearer in which radio protocols are arranged only in the MeNB 6 in order to use only resources (e.g., the MCG) of the MeNB 6 and a connection (S1-U) is maintained between a gateway apparatus (Serving Gateway (S-GW) or Packet Data Network Gateway (P-GW)) and the MeNB 6, similar to normal LTE that does not perform DC. The second configuration is an SCG bearer. The SCG bearer is a bearer in which the radio protocols are arranged only in the SeNB 7 in order to use only resources (e.g., the SCG) of the SeNB 7 and the connection (S-U) is maintained between the gateway apparatus (S-GW or P-GW) and the SeNB 7. The third configuration is a Split bearer. The Split bearer is a bearer in which the radio protocols are arranged in both the MeNB 6 and the SeNB 7 in order to use both resources (e.g., MCG and SCG) of the MeNB 6 and the SeNB 7. In the Split bearer, the connection (S1-U) is maintained between the gateway apparatus (S-GW or P-GW) and the MeNB 6 and UP data (e.g., PDCP PDU) to be transmitted in the SCG is forwarded, for example, from the MeNB 6 to the SeNB 7 via the X2. When LAA is performed in the SeNB 7 and the UE 8 that are executing DC, the cell on the unlicensed frequency is used as the SCell together with, for example, the PSCell of the SCG. In this case, the radio bearer corresponding to the SCG bearer or the Split bearer is established in the cell on the unlicensed frequency.

The technique to allow the UE 3 to recognize whether UL LBT is needed, described in the first to fourth embodiments, may be applied to the case of Dual Connectivity shown in FIG. 14 as well. That is, one or both of the MeNB 6 and the SeNB 7 transmit the control information regarding UL LBT. The UE 8 recognizes (determines), based on this control information, whether UL LBT is needed, performs the UL transmission after performing UL LBT when the UE 8 has recognized that UL LBT is needed, and performs the UL transmission without performing UL LBT when the UE 8 has recognized that UL LBT is not needed. This control information may include one or both of the "information regarding necessity for UL LBT" and the "information regarding the regulatory requirements for the radio communication on the unlicensed frequency".

Figure 15:
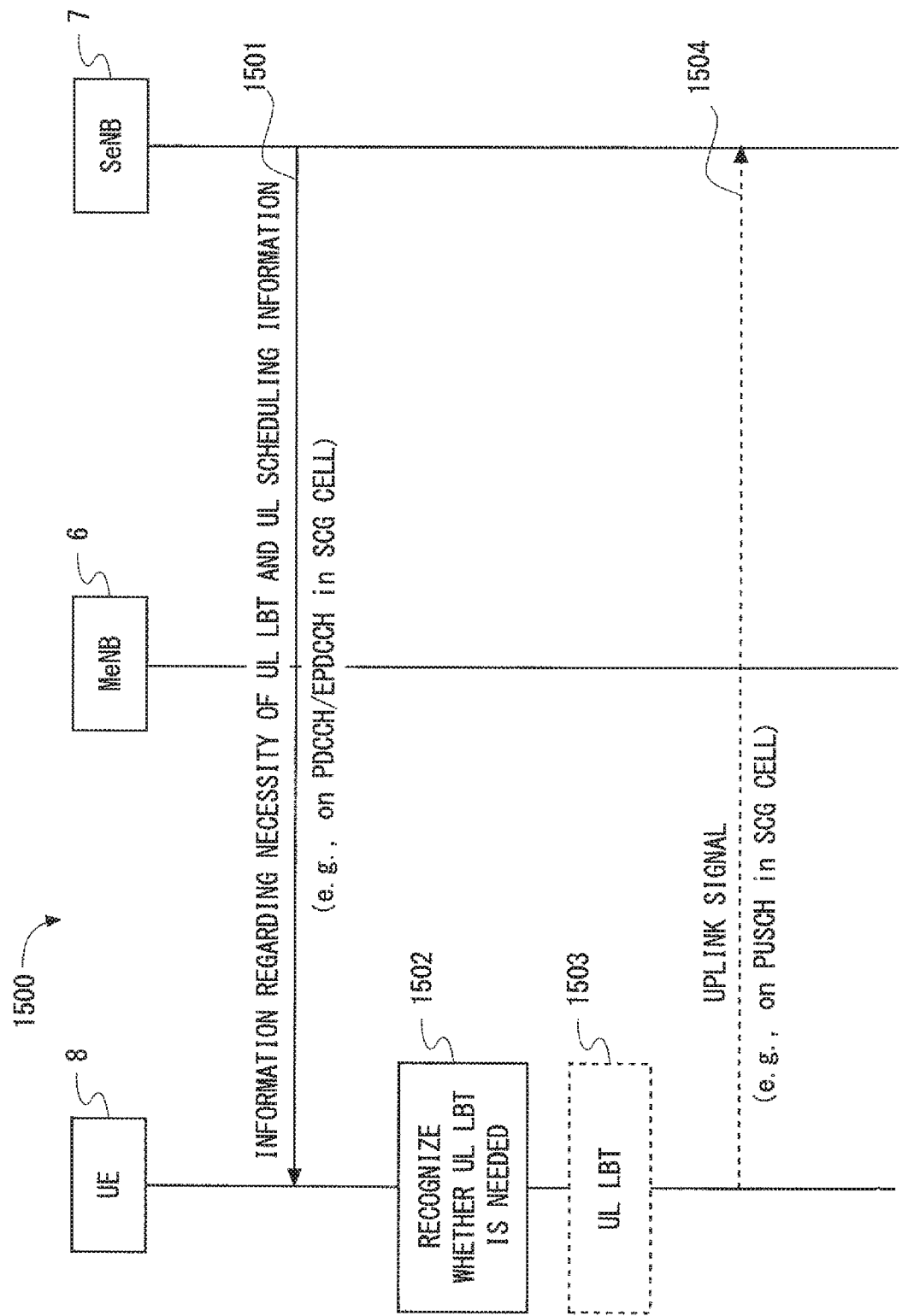
FIG. 15 is a sequence diagram showing one example of operations of a radio base station and a radio terminal according to a fifth embodiment.

FIG. 15 is a sequence diagram showing one example of operations of the MeNB 6, the SeNB 7, and the UE 8 (Process 1500). The procedure shown in FIG. 15 is substantially the same as the procedure shown in FIG. 5 except that the transmission of the control information (information regarding necessity of LBT) is performed by the SeNB 7, not by the eNB 1. That is, in Block 1501, the SeNB 7 transmits the information regarding necessity of LBT (e.g., Flag or Boolean) to the UE 3 together with uplink scheduling information (UL grant) on a PDCCH/EPDCCH in any one of the SCG cells. The SeNB 7 may first transmit the information regarding necessity of LBT on a PDCCH/EPDCCH different from a PDCCH/EPDCCH in which the UL grant is transmitted. In this case, the SeNB 7 may transmit these PDCCHs/EPDCCHs in cells different from each other in the SCG. The eNB 1 may transmit one or more PDCCHs/EPDCCHs in the SCG cell on the unlicensed frequency or in the SCG cell (e.g., PSCell) on the licensed frequency. The processes performed in Blocks 1502-1504 are similar to those performed in Blocks 502-504 in FIG. 5, and thus their descriptions are omitted here.

Figure 16:
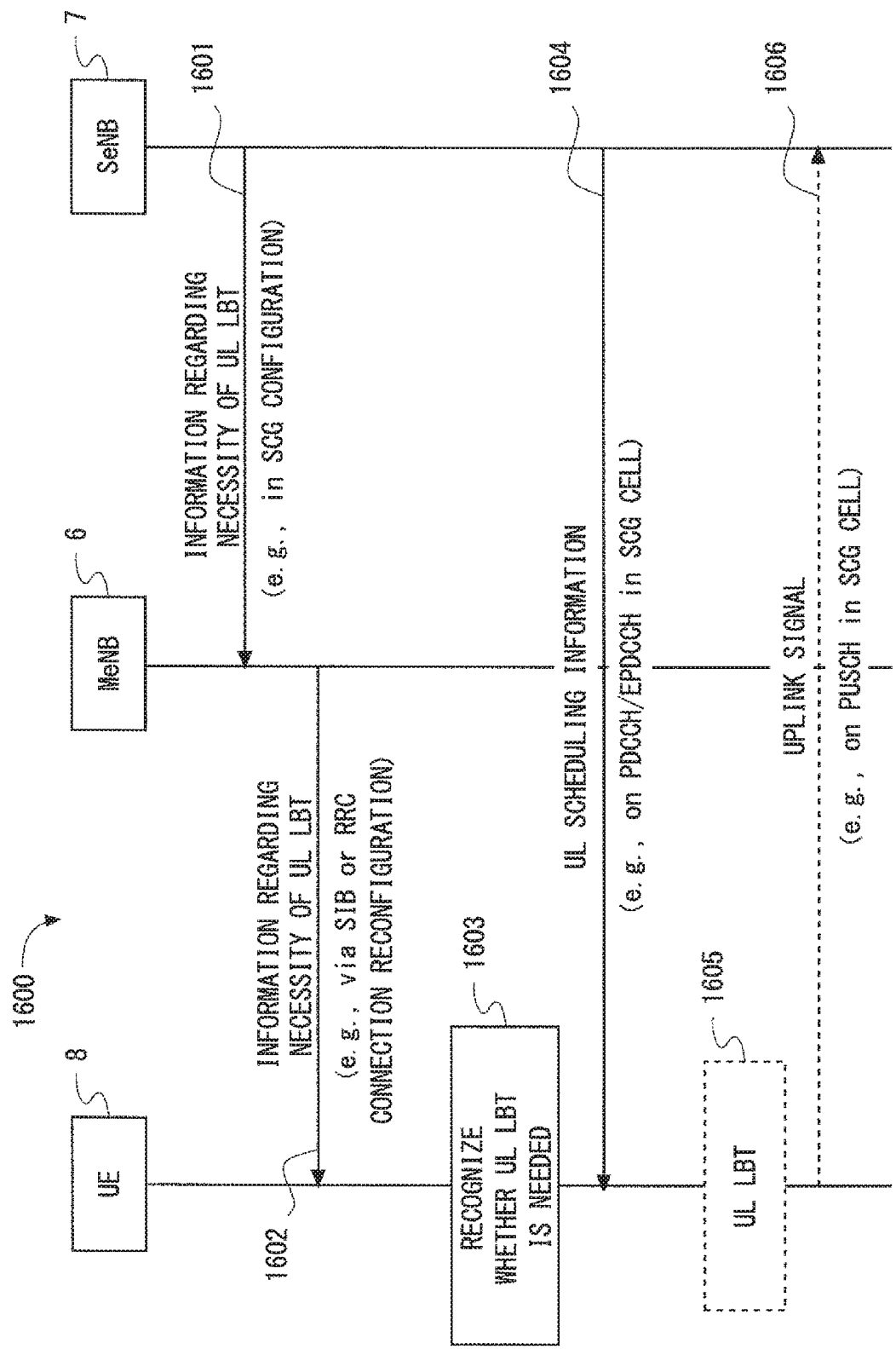
FIG. 16 is a sequence diagram showing one example of operations of the radio base station and the radio terminal according to the fifth embodiment.

FIG. 16 is a sequence diagram showing one example of operations of the MeNB 6, the SeNB 7, and the UE 8 (Process 1600). The procedure shown in FIG. 16 is substantially the same as that shown in FIG. 6 except that the transmission of the control information (the information regarding necessity of LBT) is performed by the SeNB 7, not by the eNB 1, via the MeNB 6 and that the transmission of the UL scheduling information (UL grant) is performed by the SeNB 7, not by the eNB 1. That is, in Block 1601, the SeNB 7 transmits the information regarding necessity of LBT (e.g., Flag or Boolean) to the MeNB 6 by (SCG-Config within) an SeNB Modification Required message. In Block 1602, the MeNB 6 transmits the information regarding necessity of LBT to the UE 3 via system information (SIB) or dedicated signaling (RRC Connection Reconfiguration message) in the MCG Cell (e.g., PCell). The processes performed in Blocks 1603-1606 are similar to those performed in Blocks 602-605 in FIG. 6, and thus their descriptions are omitted here.

Figure 17:
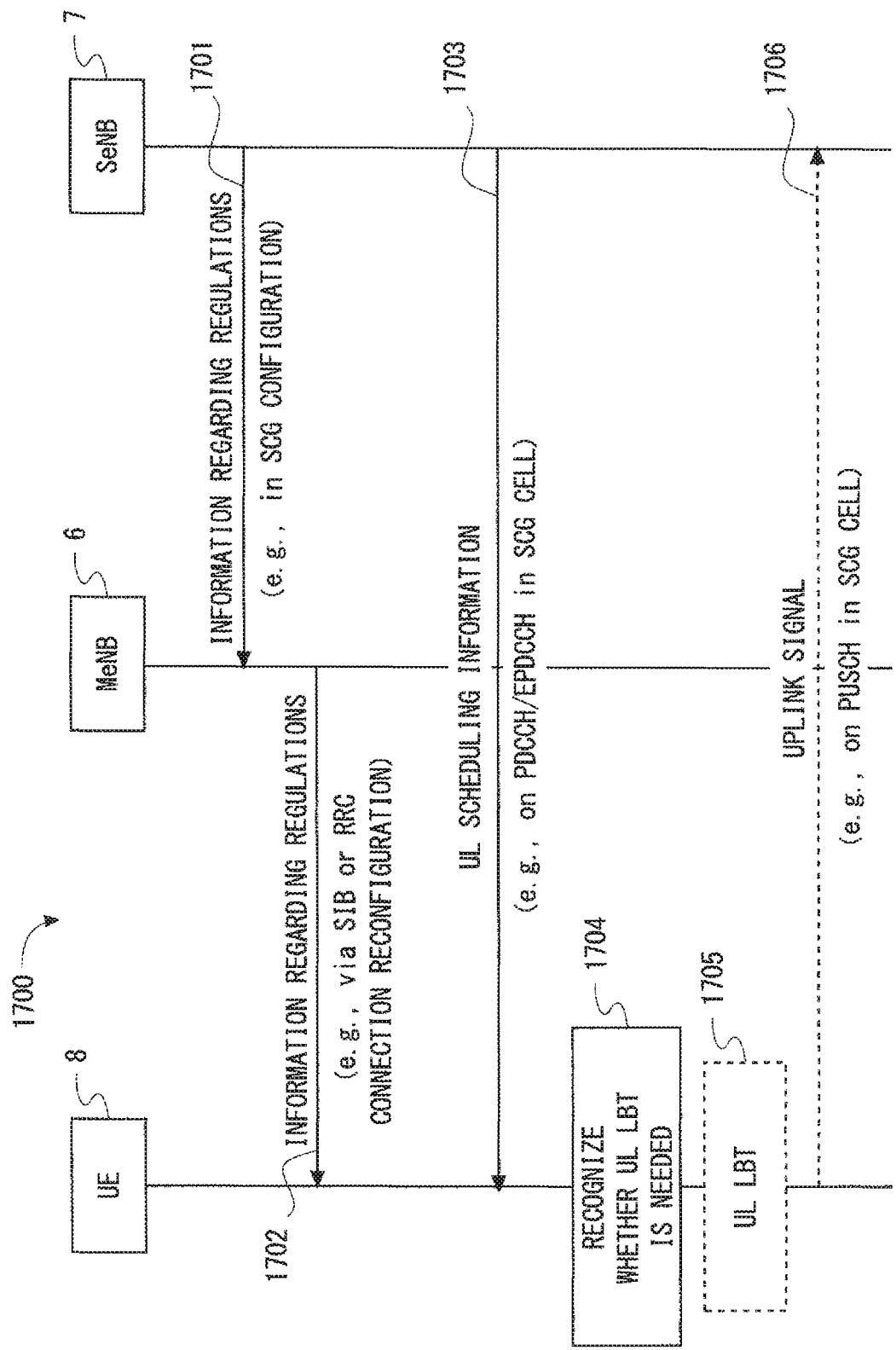
FIG. 17 is a sequence diagram showing one example of operations of the radio base station and the radio terminal according to the fifth embodiment.

FIG. 17 is a sequence diagram showing one example of operations of the MeNB 6, the SeNB 7, and the UE 8 (Process 1700). The procedure shown in FIG. 17 is substantially the same as that shown in FIG. 7 except that the transmission of the control information (the information regarding regulations for the radio communication on the unlicensed frequency) is performed by the SeNB 7, not by the eNB 1, via the MeNB 6 and the transmission of the UL scheduling information (UL grant) is performed by the SeNB 7, not by the eNB 1. That is, in Block 1701, the SeNB 7 transmits the information regarding the regulations to the MeNB 6 by (SCG-Config within) an SeNB Modification Required message. In Block 1702, the MeNB 6 transmits the information regarding the regulations to the UE 3 via system information (SIB) or dedicated signaling (RRC Connection Reconfiguration message) in the MCG Cell (e.g., the PCell). The processes performed in Blocks 1703-1606 are similar to those performed in Blocks 702-705 in FIG. 7, and thus their descriptions are omitted here.

Figure 18:
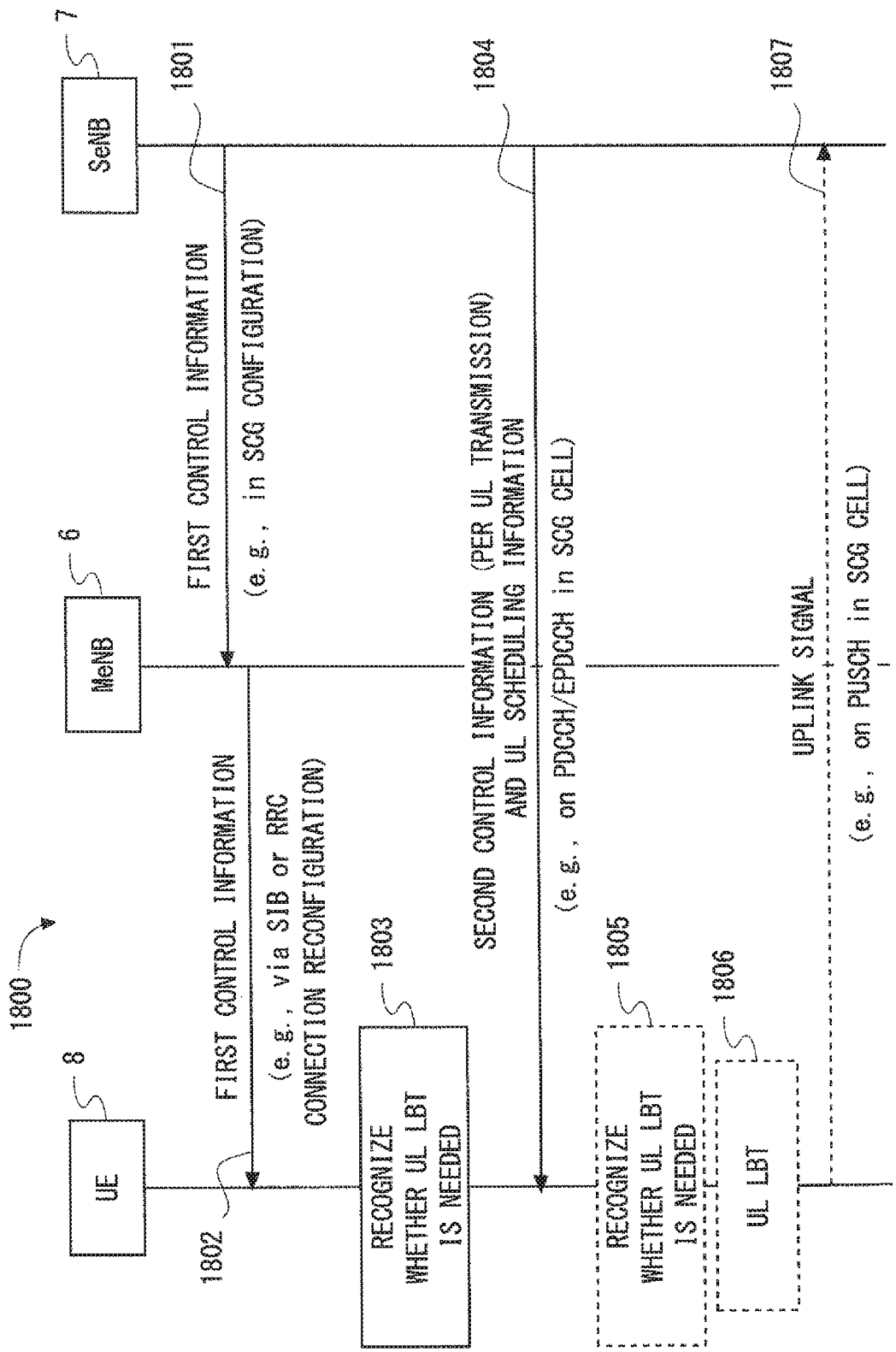
FIG. 18 is a sequence diagram showing one example of operations of the radio base station and the radio terminal according to the fifth embodiment.

FIG. 18 is a sequence diagram showing one example of operations of the MeNB 6, the SeNB 7, and the UE 8 (Process 1800). The procedure shown in FIG. 17 is substantially the same as that shown in FIG. 13 except that the transmission of the first control information is performed by the SeNB 7, not by the eNB 1, via the MeNB 6 and that the transmission of the second control information and the UL scheduling information (UL grant) is performed by the SeNB 7, not by the eNB 1. That is, in Block 1801, the SeNB 7 transmits the first control information to the MeNB 6 by (SCG-Config within) an SeNB Modification Required message. In Block 1802, the MeNB 6 transmits the first control information to the UE 3 via system information (SIB) or dedicated signaling (RRC Connection Reconfiguration message) in the MCG Cell (e.g., the PCell). In Block 1804, the SeNB 7 transmits the second control information to UE 3 on a PDCCH/EPDCCH together with the uplink scheduling information (UL grant) in any one of the SCG cells. The processes performed in Blocks 1803 and 1805-1807 are similar to those performed in Blocks 1302 and 1304-1306 in FIG. 13, and thus their descriptions are omitted here.

Lastly, configuration examples of the radio base stations (LTE-U eNB 1) and the radio terminals (UE 3) according to the aforementioned embodiments will be described. Each of the radio base stations (LTE-U eNB 1) described in the aforementioned embodiments may include a transceiver for communicating with a radio terminal (UE 3) and a controller that is coupled to the transceiver. This controller executes the processing regarding one of the radio base stations (LTE-U eNB 1) described in the aforementioned embodiments (e.g., detection of PCI conflicts on the basis of CRS based and CSI-RS based received signal quality).

Each of the radio terminals (UE 3) descried in the aforementioned embodiments may include a transceiver for communicating with a radio base station LTE-U eNB 1) and a controller that is coupled to the transceiver. This controller executes the processing regarding one of the radio terminals (UE 3) described in the aforementioned embodiments (e.g., report of CRS based and CSI-RS based received signal quality to the LTE-U eNB 1).

Figure 19:
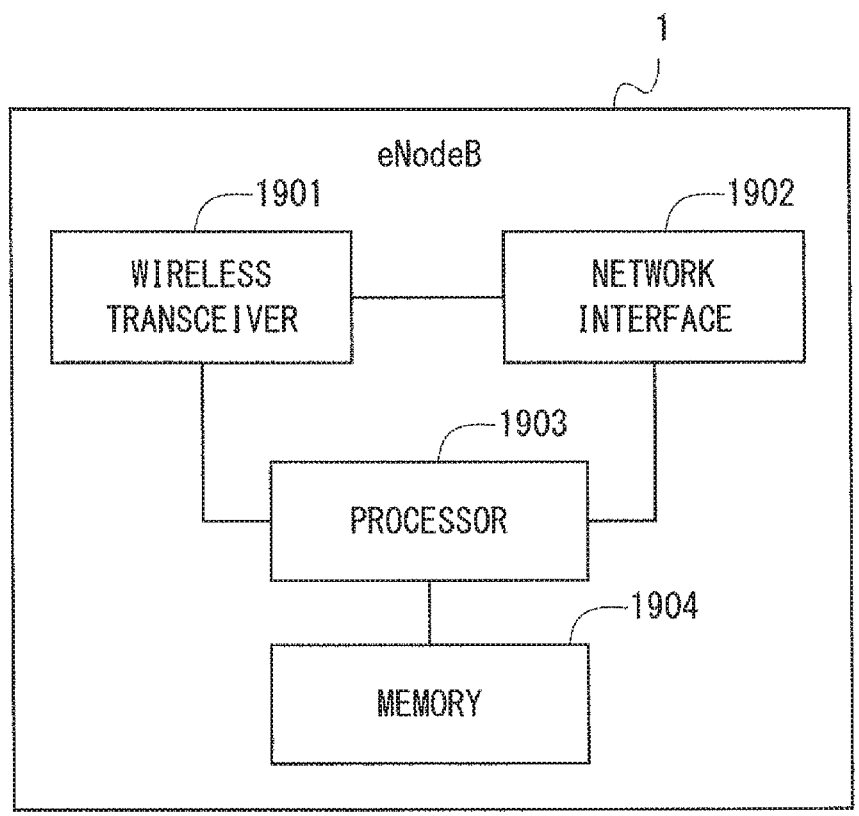
FIG. 19 is a block diagram showing a configuration example of a radio base station according to several embodiments.

FIG. 19 is a block diagram showing a configuration example of the radio base station (LTE-U eNB) 1 according to the aforementioned embodiments. With reference to FIG. 19, the LTE-U eNB 1 includes a wireless transceiver 1901, a network interface 1902, a processor 1903, and a memory 1904. The wireless transceiver 1901 is configured to communicate with the UE 3. The network interface 1902 is used to communicate with a network node (e.g., a Mobility Management Entity (MME) and a Serving Gateway (S-GW)). The network interface 1902 may include, for example, a network interface card (NIC) conforming to IEEE 802.3 series.

The processor 1903 loads software codes (computer program) from the memory 1904 and executes the loaded software codes, thereby performing the processing of the LTE-U eNB 1 described in the aforementioned embodiments. The processor 1903 may be, for example, a microprocessor, a Micro Processing Unit (MPU), or a Central Processing Unit (CPU). The processor 1903 may include a plurality of processors.

The memory 1904 is formed of a combination of a volatile memory and a nonvolatile memory. The volatile memory is, for example, a Static Random Access Memory (SRAM), a Dynamic RAM (DRAM), or a combination thereof. The nonvolatile memory is, for example, a mask Read Only Memory (MROM), a Programmable ROM (PROM), a flash memory, a hard disc drive, or a combination thereof. The memory 1904 may include a storage remotely located from the processor 1903. In this case, the processor 1903 may access the memory 1904 via the network interface 1902 or an I/O interface (not shown).

The memory 1904 may be used to store one or more software modules including instructions and data for executing the processing of the LTE-U eNB 1 described in the aforementioned embodiments. The processor 1903 loads the one or more software modules from the memory 1904 and executes the loaded software module(s), thereby performing the processing of the LTE-U eNB 1 described in the aforementioned embodiments.

Figure 20:
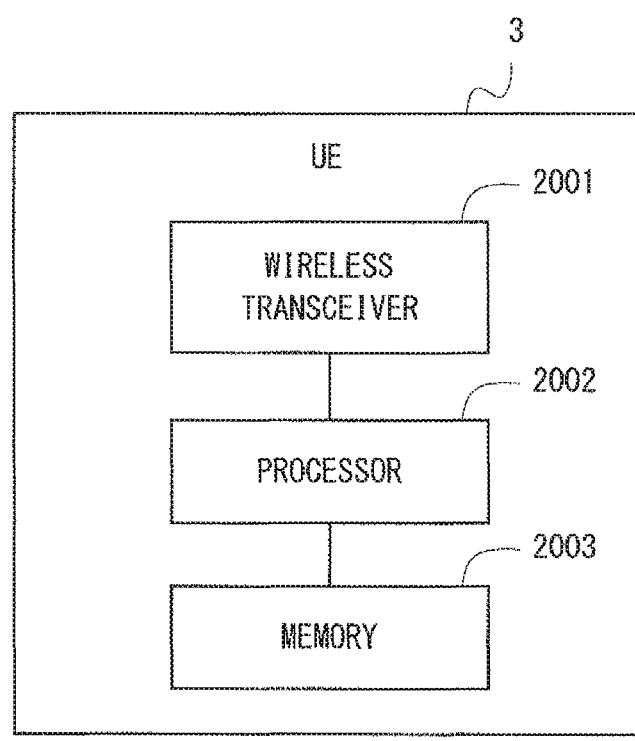
FIG. 20 is a block diagram showing a configuration example of a radio terminal according to several embodiments.
Figure 21:
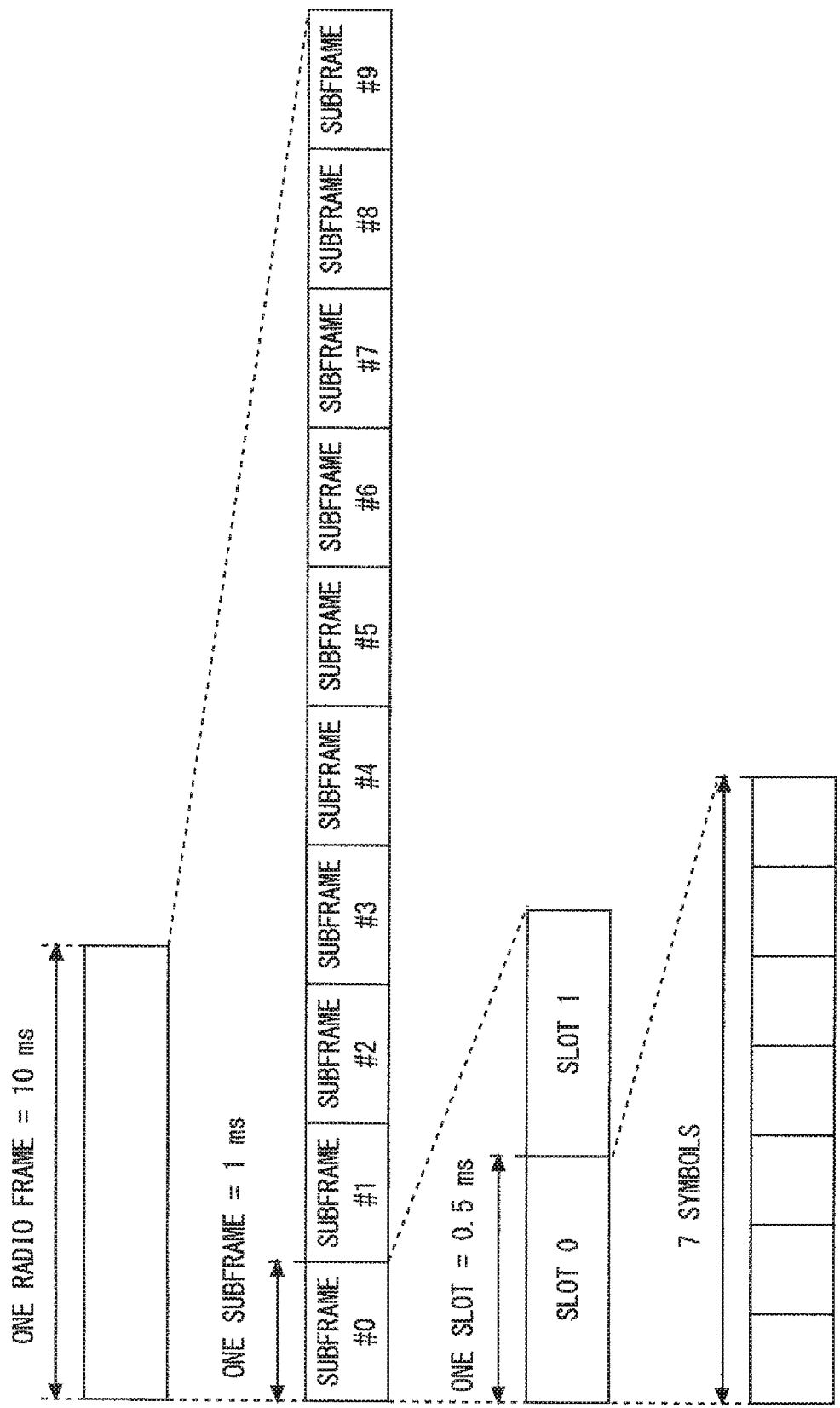
FIG. 21 is a diagram showing a radio frame structure and a subframe structure of LTE.
Figure 23:
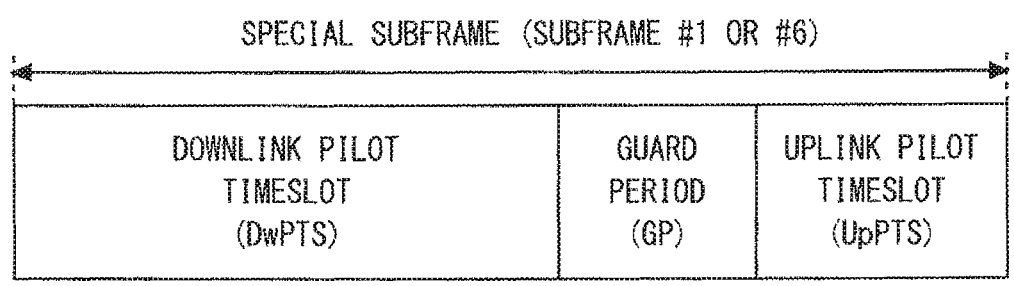
FIG. 23 is a diagram showing a structure of a special subframe defined for TDD LTE.
Figure 24:
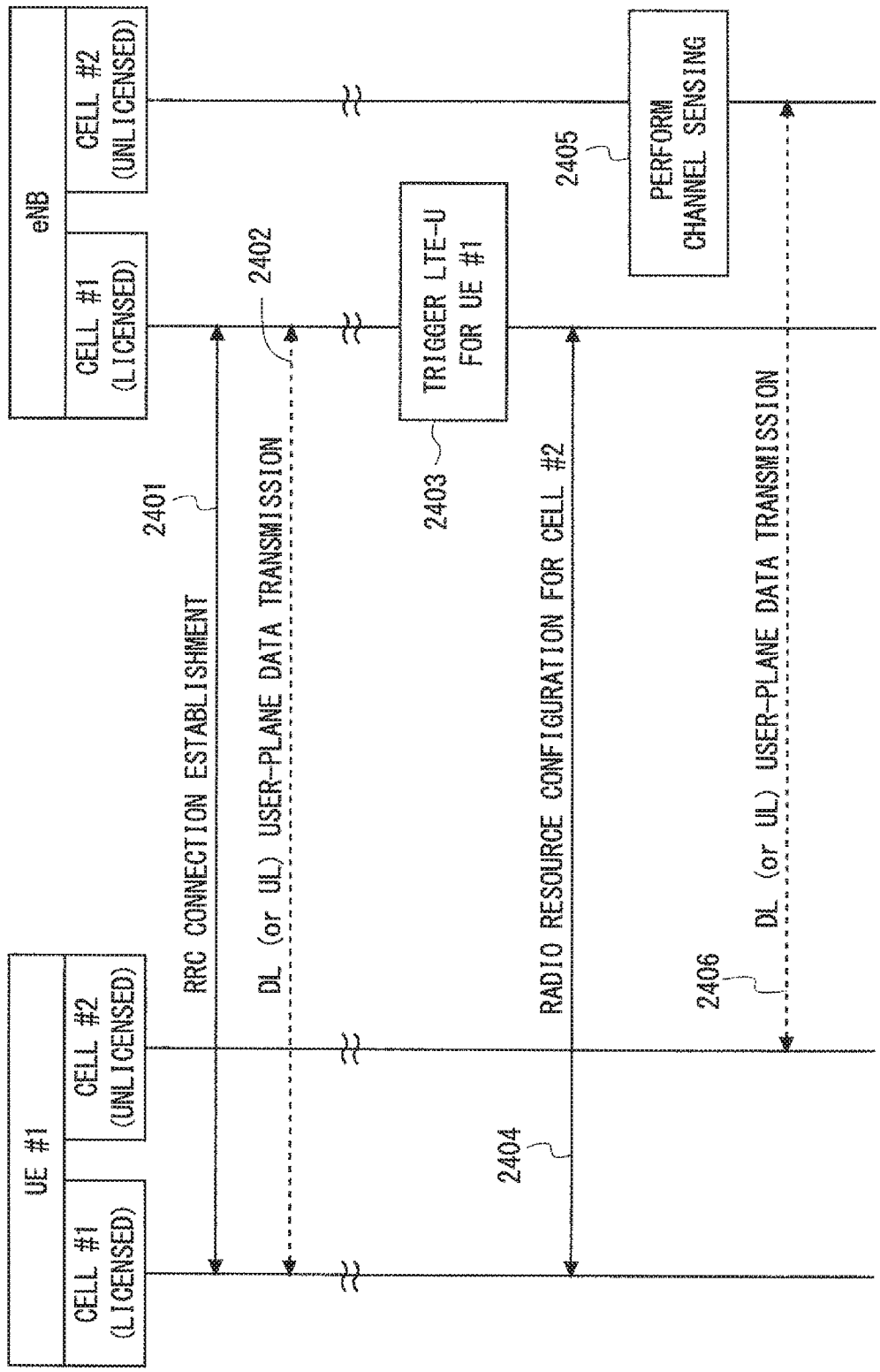
FIG. 24 is a sequence diagram showing one example of operations of the radio base station and the radio terminal in LTE-U.

FIG. 20 is a block diagram showing a configuration example of the radio terminal (UE) 3 according to the aforementioned embodiments. With reference to FIG. 20, the UE 3 includes a wireless transceiver 2001, a processor 2002, and a memory 2003. The wireless transceiver 2001 is configured to communicate with the LTE-U eNB 1.

The processor 2002 loads software codes (computer program) from the memory 2003 and executes the loaded software codes, thereby performing the processing of the UE 3 described in the aforementioned embodiments. The processor 2002 may be, for example, a microprocessor, an MPU, or a CPU. The processor 2002 may include a plurality of processors.

The memory 2003 is formed of a combination of a volatile memory and a nonvolatile memory. The volatile memory is, for example, an SRAM, a DRAM, or a combination thereof. The nonvolatile memory is, for example, an MROM, a PROM, a flash memory, a hard disc drive, or a combination thereof. The memory 2003 may include a storage remotely located from the processor 2002. In this case, the processor 2002 may access the memory 2003 via an I/O interface (not shown).

The memory 2003 may be used to store one or more software modules including instructions and data for executing the processing of the UE 3 described in the aforementioned embodiments. The processor 2002 loads the one or more software modules from the memory 2003 and executes the loaded software module(s), thereby performing the processing of the UE 3 described in the aforementioned embodiments.

As described above with reference to FIGS. 19 and 20, the processors included in the LTE-U eNB 1 and the UE 3 according to the aforementioned embodiments may each execute one or more programs including instructions that cause a computer to perform the algorithms described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

OTHER EMBODIMENTS

The aforementioned plurality of embodiments may be implemented individually or in any combination.

In the aforementioned plurality of embodiments, when the eNB 1 (the MeNB 6 or the SeNB 7) transmits the uplink scheduling information (UL grant) on the unlicensed frequency, the eNB 1 may perform LBT on the unlicensed frequency channel (resources) prior to this transmission of the information. Even when the eNB 1 (the MeNB 6 or the SeNB 7) transmits the UL grant on the unlicensed frequency, the eNB 1 may perform LBT (i.e., UL LBT) on the unlicensed frequency channel (resources) scheduled to the UE 3 for the UL transmission in the UL grant.

In the aforementioned plurality of embodiments, the other systems or networks that are treated by the UE 3 as the targets for LBT may either be only the LTE systems (LTE-U. LAA) of other operators or only WLAN. In other words, the UE 3 may not treat all the other systems or networks that commonly use the same unlicensed frequency as the targets for LBT. Alternatively, the UE 3 may operate to recognize whether UL LBT is needed for some of the plurality of other systems or networks that commonly use the same unlicensed frequency. Alternatively, the UE 3 may apply the technique of one embodiment to LBT for some (e.g., LTE systems of other operators) of the plurality of other systems or networks that commonly use the same unlicensed frequency and apply the technique of another embodiment to LBT for the other systems or networks (e.g., WLAN systems).

The explanations of the aforementioned plurality of embodiments have mainly been provided with regard to the LTE system. However, as already stated above, these embodiments may be applied to radio communication systems other than the LTE system such as the 3GPP UMTS, the 3GPP2 CDMA2000 system (1×RTT, HRPD), the GSM (registered trademark)/GPRS system, or the WiMAX system. The radio base station (eNB) and the RRH/RRE having the function of performing the LTE communication on the unlicensed frequency have been referred to as a radio base station (LTE-U eNB). In the other systems as well, network apparatuses capable of communicating on the plurality of frequencies (e.g., the licensed frequency and the unlicensed frequency) may be introduced and they may be collectively referred to as a radio station. That is, the radio station corresponds, for example, to a radio base station (eNB) and an RRH/RRE in the LTE as described above, to a base station (NodeB (NB)) and a base station controller (RNC) in the UMTS, or to a base station (BTS) and a base station controller (BSC) in the CDMA2000 system. Further, in the example of the Dual Connectivity (DC) in particular, a base station system including a main base station (MeNB in LTE) and a sub base station (SeNB in LTE) may be referred to as a radio station. Each of the main base station and the sub base station may be referred to as a radio communication node.

Further, the embodiments stated above are merely examples regarding applications of the technical ideas obtained by the present inventor. These technical ideas are not limited only to the embodiments described above, and various modifications may be made as a matter of course.

This application is based upon and claims the benefit of priority from Japanese Patent Application No. 2014-262541, filed on Dec. 25, 2014, the disclosure of which is incorporated herein in its entirety by reference.

REFERENCE SIGNS LIST 1, 6, 7 RADIO BASE STATION
3, 8 RADIO TERMINAL
4 WIRELESS LAN ACCESS POINT
5 WIRELESS LAN TERMINAL
1901, 2001 WIRELESS TRANSCEIVER
1902 NETWORK INTERFACE
1903, 2002 PROCESSOR
1904, 2003 MEMORY

The invention claimed is:

1. A radio terminal comprising:
at least one processor; and
a transceiver; wherein
the at least one processor is configured to perform carrier aggregation between a primary cell operated by a radio station and a secondary cell operated by the radio station and operated in an unlicensed spectrum or in a shared spectrum,
the transceiver is configured to receive, from the radio station, control information on a Physical Downlink Control Channel, the control information including a maximum continuous use time allowed after determining in Listen Before Talk (LBT) that radio resources are available, and LBT determination information associated with a threshold used for LBT which is usable for sensing a channel of the secondary cell to determine whether the channel is idle for uplink transmission on the secondary cell,
the at least one processor is configured to determine, based on the on the maximum continuous use time, whether to perform LBT before performing uplink data transmission on the unlicensed spectrum or shared spectrum,
the at least one processor is configured to determine which of two LBT types is used for the sensing based on the LBT determination information, and
the at least one processor is configured to perform the sensing based on the determination, corresponding to either the first LBT type or the second LBT type based on the control information, and if the channel is available, perform the uplink data transmission on the unlicensed spectrum or shared spectrum.

2. The radio terminal according to claim 1, wherein the at least one processor is configured to control the transceiver to perform the uplink transmission on the secondary cell without performing the sensing the channel in a case where the determined one of the two LBT types indicates that the sensing the channel is not needed.

3. The radio terminal according to claim 1, wherein
the control information indicates a number of subframes for the uplink transmission,
the at least one processor is configured to control the transceiver to perform the uplink transmission in a subframe in a case where the channel is determined to be idle for the uplink transmission on the secondary cell based on the sensing the channel, and
the at least one processor is configured to control the transceiver to perform the uplink transmission on the channel without the sensing the channel in the number of subframes and after the subframe.

4. The radio terminal according to claim 1, wherein
the LBT determination information includes the threshold for the sensing the channel, and
the at least one processor is configured to perform the sensing the channel to detect energy by using the threshold.

5. The radio terminal according to claim 1, wherein the at least one processor is configured to perform the sensing the channel to detect preamble, in a case where the determined one of the two LBT types is indicating to perform the sensing the channel to detect preamble for the uplink transmission on the secondary cell.

6. The radio terminal according to claim 1, wherein
the LBT determination information indicates one of the two LBT types and the control information includes information of resource allocation for the uplink transmission on the secondary cell, and
the at least one processor is configured to control the transceiver to perform the uplink transmission on the secondary cell based on the information of resource allocation in a case where the channel is determined to be idle for the uplink transmission on the secondary cell based on the sensing the channel corresponding to the one of the two LBT types.

7. The radio terminal according to claim 1, wherein the two LBT types differ in whether they use energy detection or preamble detection.

8. The radio terminal according to claim 1, wherein the control information further includes at least one of a continuous use time allowed after a predetermined signal is received or a duty cycle information.

9. A method performed by a radio terminal configured to perform carrier aggregation between a primary cell operated by a radio station and a secondary cell operated by the radio station and operated in an unlicensed spectrum or in a shared spectrum, the method comprising:
receiving, from the radio station, control information on a Physical Downlink Control Channel, the control information including a maximum continuous use time allowed after determining in Listen Before Talk (LBT) that radio resources are available, and LBT determination information associated with a threshold used for LBT which is usable for sensing a channel of the secondary cell to determine whether the channel is idle for uplink transmission on the secondary cell;
determining, based on the on the maximum continuous use time, whether to perform LBT before performing uplink data transmission on the unlicensed spectrum or shared spectrum;
determining which of two LBT types is used for the sensing based on the LBT determination information; and
performing the sensing based on the determination, and if the channel is available, perform the uplink data transmission on the unlicensed spectrum or shared spectrum.

10. The method according to claim 9, further comprising:
performing the uplink transmission on the secondary cell without performing the sensing the channel in a case where the determined one of the two LBT types indicates that the sensing the channel is not needed.

11. The method according to claim 9, wherein
the control information indicates a number of subframes for the uplink transmission, and the method further comprises:
performing the uplink transmission in a subframe in a case where the channel is determined to be idle for the uplink transmission on the secondary cell based on the sensing the channel, and
performing the uplink transmission on the channel without the sensing the channel in the number of subframes and after the subframe.

12. The method according to claim 9, wherein
the LBT determination information includes the threshold for the sensing the channel, and
the performing the sensing includes performing the sensing the channel to detect energy by using the threshold.

13. The method according to claim 9, wherein the performing the sensing includes performing the sensing the channel to detect preamble, in a case where the determined one of the two LBT types is indicating to perform the sensing the channel to detect preamble for the uplink transmission on the secondary cell.

14. The method according to claim 9, wherein
the LBT determination information indicates one of the two LBT types and the control information includes information of resource allocation for the uplink transmission on the secondary cell, and
the method further comprises:
performing the uplink transmission on the secondary cell based on the information of resource allocation in a case where the channel is determined to be idle for the uplink transmission on the secondary cell based on the sensing the channel corresponding to the one of the two LBT types.

15. The method according to claim 9, wherein the two LBT types differ in whether they use energy detection or preamble detection.

16. The method according to claim 9, wherein the control information further includes at least one of a continuous use time allowed after a predetermined signal is received or a duty cycle information.

17. A radio station comprising:
a transceiver; and
at least one processor; wherein
the at least one processor is configured to operate a primary cell and a secondary cell in an unlicensed spectrum or shared spectrum,
the at least one processor is configured to control the transceiver to transmit, to a radio terminal configured to perform carrier aggregation between the primary cell and the secondary cell, control information and on a Physical Downlink Control Channel, the control information including a maximum continuous use time allowed after determining in Listen Before Talk (LBT) that radio resources are available, and LBT determination information associated with a threshold used for LBT which is usable for sensing a channel of the secondary cell to determine whether the channel is idle for uplink transmission on the secondary cell,
the maximum continuous use time causes the radio terminal to determine, based on the on the maximum continuous use time, whether to perform LBT before performing uplink data transmission on the unlicensed spectrum or shared spectrum, and
the LBT determination information causes the radio terminal to determine which of two LBT types is used for the sensing based on the LBT determination information.

18. The radio station according to claim 17, wherein the LBT determination information causes the radio terminal to perform the uplink transmission on the secondary cell without performing the sensing the channel in a case where the determined one of the two LBT types indicates that the sensing the channel is not needed.

19. The radio station according to claim 17, wherein the control information indicates a number of subframes in which the radio terminal performs the uplink transmission without the sensing the channel, wherein the number of subframes is after a subframe in which the radio terminal performs the uplink transmission in a case where the channel is determined to be idle for the uplink transmission on the secondary cell based on the sensing the channel.

20. The radio station according to claim 17, wherein
the LBT determination information includes the threshold for the sensing the channel, and
the threshold is used for the sensing the channel to detect energy.

21. The radio station according to claim 17, wherein
the LBT determination information indicates one of the two LBT types and the control information includes information of resource allocation for the uplink transmission on the secondary cell, and the information of resource allocation is used for the performing the uplink transmission on the secondary cell in a case where the channel is determined to be idle for the uplink transmission on the secondary cell based on the sensing the channel corresponding to the one of the two LBT types.

22. The radio station according to claim 17, wherein the two LBT types differ in whether they use energy detection or preamble detection.

23. The radio station according to claim 17, wherein the control information further includes at least one of a continuous use time allowed after a predetermined signal is received or a duty cycle information.

24. A method performed by a radio station configured to operate a primary cell and a secondary cell in an unlicensed spectrum or shared spectrum, the method comprising:

transmitting, to a radio terminal configured to perform carrier aggregation between the primary cell and the secondary cell, control information on a Physical Downlink Control Channel, the control information including a maximum continuous use time allowed after determining in Listen Before Talk (LBT) that radio resources are available, and LBT determination information associated with a threshold used for LBT which is usable for sensing a channel of the secondary cell to determine whether the channel is idle for uplink transmission on the secondary cell, the maximum continuous use time causing the radio terminal to determine, based on the on the maximum continuous use time, whether to perform LBT before performing uplink data transmission on the unlicensed spectrum or shared spectrum, the LBT determination information causing the radio terminal to determine which of two LBT types is used for the sensing based on the LBT determination information.

25. The method according to claim 24, wherein the LBT determination information causes the radio terminal to perform the uplink transmission on the secondary cell without performing the sensing the channel in a case where the determined one of the two LBT types indicates that the sensing the channel is not needed.

26. The method according to claim 24, wherein the control information indicates a number of subframes in which the radio terminal performs the uplink transmission without the sensing the channel, wherein the number of subframes is after a subframe in which the radio terminal performs the uplink transmission in a case where the channel is determined to be idle for the uplink transmission on the secondary cell based on the sensing the channel.

27. The method according to claim 24, wherein
the LBT determination information includes the threshold for the sensing the channel, and
the threshold is used for the sensing the channel to detect energy.

28. The method according to claim 24, wherein
the LBT determination information indicates one of the two LBT types and the control information includes information of resource allocation for the uplink transmission on the secondary cell, and
the information of resource allocation is used for the performing the uplink transmission on the secondary cell in a case where the channel is determined to be idle for the uplink transmission on the secondary cell based on the sensing the channel corresponding to the one of the two LBT types.

29. The method according to claim 24, wherein the two LBT types differ in whether they use energy detection or preamble detection.

30. The method according to claim 24, wherein the control information further includes at least one of a continuous use time allowed after a predetermined signal is received or a duty cycle information.

* * * * *